US012682839B2

(12) United States Patent
Kuang et al.

(10) Patent No.: US 12,682,839 B2
(45) Date of Patent: Jul. 14, 2026

(54) DISPLAY PANEL AND DISPLAY DEVICE

(71) Applicant: Xiamen Tianma Display Technology Co., Ltd., Xiamen (CN)

(72) Inventors: Jian Kuang, Xiamen (CN); Yana Gao, Xiamen (CN); Xingyao Zhou, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 19/183,717

(22) Filed: Apr. 18, 2025

(65) Prior Publication Data

US 2025/0246131 A1 Jul. 31, 2025

(30) Foreign Application Priority Data

Dec. 20, 2024 (CN) ......................... 202411896956.4

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01); *G09G 2300/0852* (2013.01); *G09G 2310/0267* (2013.01); *G09G 2310/0286* (2013.01); *G09G 2310/061* (2013.01); *G09G 2310/08* (2013.01); *G09G 2330/021* (2013.01)

(58) Field of Classification Search
CPC .... G11C 19/28; G11C 19/287; G09G 3/3266; G09G 3/3674; G09G 2310/0264; G09G 2310/0283
See application file for complete search history.

(56) References Cited

U.S. PATENT DOCUMENTS

2022/0310184 A1* 9/2022 Zhang .................. G09G 3/3225

* cited by examiner

*Primary Examiner* — Kevin M Nguyen
(74) *Attorney, Agent, or Firm* — KDW FIRM PLLC

(57) ABSTRACT

Provided are a display panel and a display device. The display panel includes a driver circuit. The driver circuit includes N-stage cascaded shift register units. In the same shift register unit, the initial control module is configured to at least receive an input signal and a first clock signal and control a signal of a first initial node and a signal of a second initial node. The stage transmission output module is configured to at least receive the signal of the first initial node, the signal of the second initial node, a first level signal, and a second level signal and control a stage transmission signal. The driving control module is configured to at least receive the signal of the first initial node, the signal of the second initial node, and a driving control signal and control a signal of a first driving node.

37 Claims, 25 Drawing Sheets

Mode 1

Mode 2

DISPLAY PANEL AND DISPLAY DEVICE

CROSS-REFERENCE TO RELATED APPLICATION(S)

This application claims priority to Chinese Patent Application No. 202411896956.4, filed on Dec. 20, 2024, the disclosure of which is incorporated herein by reference in its entirety.

TECHNICAL FIELD

The present invention relates to the field of display technology, in particular, a display panel and a display device.

BACKGROUND

At present, with the development of display technology, display panels have become ubiquitous in daily life. Display panels can employ different image refresh rates for display in different application scenarios. For instance, a higher image refresh rate (also referred to as high-frequency driving) is used to drive dynamic images to ensure smooth motion rendering whereas a lower image refresh rate (also referred to as low-frequency driving) is used to drive static images to reduce power consumption.

To achieve image refreshing, pixel circuits of display panels are typically scanned at a scan cycle matching the image refresh frequency. At this point, a driver circuit is typically set up in a display panel to sequentially provide enable levels of gate driving signals to each row of pixel circuits, enabling display units driven by each row of pixel circuits to display images.

To meet the diversified display effects of partitioned displays, the driver circuit can select whether to transmit enable levels of gate driving signals to pixel circuits based on the refresh frequency of the region where the pixels are located. However, when the driver circuit outputs a valid pulse of the gate driving signal for an extended period, fluctuations may occur in the gate driving signal, potentially affecting the display effect.

SUMMARY

The present invention provides a display panel and a display device, which can improve the stability of gate driving signals.

According to an aspect of the present invention, a display panel is provided. The display panel includes a driver circuit.

The driver circuit includes N-stage cascaded shift register units. A shift register unit of the N-stage cascaded shift register units includes an initial control module, a stage transmission output module, a driving control module, an active auxiliary module, and a driving output module.

In the same shift register unit, the initial control module is configured to at least receive an input signal and a first clock signal and control a signal of a first initial node and a signal of a second initial node.

The stage transmission output module is configured to at least receive the signal of the first initial node, the signal of the second initial node, a first level signal, and a second level signal and control a stage transmission signal.

The driving control module is configured to at least receive the signal of the first initial node, the signal of the second initial node, and a driving control signal and control a signal of a first driving node.

The driving output module is configured to at least receive the signal of the first driving node, the signal of the first initial node, the first level signal, and the second level signal and control a signal of a driving output node; where the driving output node is configured to output a gate driving signal.

The active auxiliary module is configured to receive the signal of the first driving node and the first level signal and control a signal transmission path of the first level signal to the driving output node.

A stage transmission signal of the i-th stage shift register unit is an input signal of the j-th stage shift register unit; where i, j, and N are each a positive integer, $i \neq j$, $i \leq N$, and $j \leq N$.

According to another aspect of the present invention, a display device is provided. The display device includes the preceding display panel.

In the display panel provided by the present invention, the stage transmission signal output from the stage transmission output module of each shift register unit is used as the input signal for other shift register units, the driving output module is controlled to output the gate driving signal through the driving control module, and the gate driving signal is used as the driving signal of the pixel circuit in the display panel. Therefore, the initial output signal and the gate driving signal output by the same shift register unit to other stages are independent of each other and do not affect each other. This arrangement ensures that the signal can be transmitted and shifted between shift register units, and the polarity of the gate output signal provided to the pixel circuit can be flexibly controlled. As a result, the driving methods of the pixel circuits in different rows of the display panel can be either the same or different, thereby meeting the diversified display needs and broadening the application scenarios of the display panel. For example, different regions of the display panel can have different refresh rates. On this basis, when the driving control signal and the first initial node are both at a non-enable level, the active auxiliary module provides a first-level signal to the driving output node, causing the gate driving signal output from the driving output node to remain active during the phase when the driving control signal stays at a non-enable level. In this manner, the active gate driving signal is less susceptible to interference from other signals, improving the stability of the gate driving signal. The gate driving signal is prevented from floating and generating significant fluctuations due to the influence of parasitic capacitance. Thus, the display effect of the display panel is effectively enhanced.

It is to be understood that the contents described in this part are not intended to identify key or important features of embodiments of the present invention and are not intended to limit the scope of the present invention. Other features of the present invention are apparent from the description provided hereinafter.

BRIEF DESCRIPTION OF DRAWINGS

To illustrate technical solutions in embodiments of the present invention more clearly, accompanying drawings used in the description of the embodiments are briefly described below. Apparently, the accompanying drawings described below illustrate part of embodiments of the present invention, and those of ordinary skill in the art may acquire other accompanying drawings based on the accompanying drawings described below on the premise that no creative work is done.

DETAILED DESCRIPTION

The solutions in embodiments of the present invention are described clearly and completely in conjunction with drawings in the embodiments of the present invention from which the solutions are better understood by those skilled in the art. Apparently, the embodiments described below are part, not all, of the embodiments of the present invention. Based on the embodiments described herein, all other embodiments acquired by those skilled in the art on the premise that no creative work is done are within the scope of the present invention.

It is to be noted that terms such as "first" and "second" in the description, claims, and drawings of the present invention are used to distinguish between similar objects and are not necessarily used to describe a particular order or sequence. It should be understood that the data used in this manner are interchangeable where appropriate so that the embodiments of the present invention described herein may also be implemented in a sequence not illustrated or described herein. Additionally, terms "comprising", "including", and any other variations thereof are intended to encompass a non-exclusive inclusion. For example, a process, method, system, product, or device that includes a series of steps or units not only includes the expressly listed steps or units but may also include other steps or units that are not expressly listed or are inherent to such a process, method, product, or device.

Figure 1:
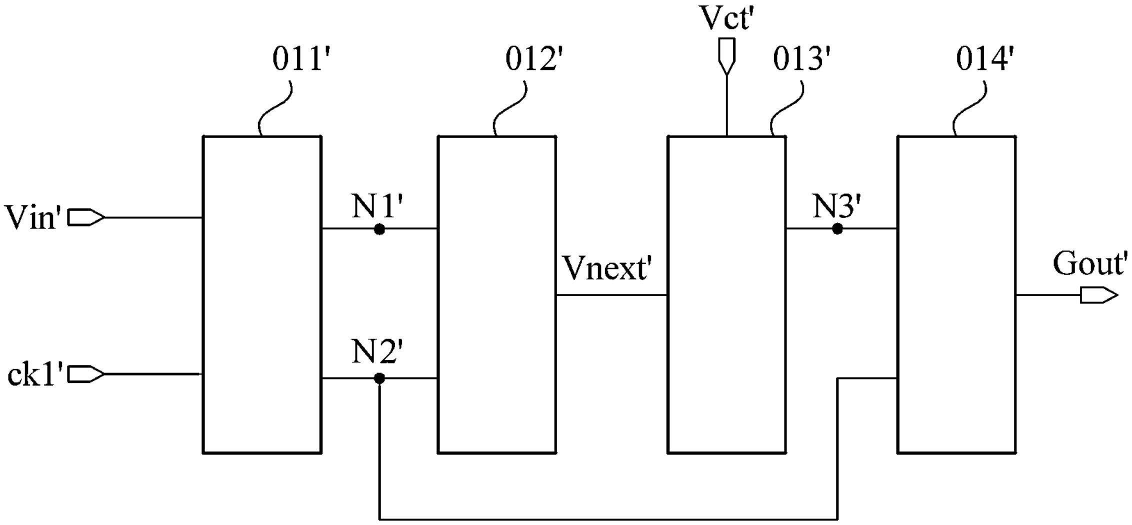
FIG. 1 is a diagram illustrating the structure of a shift register unit in the related art.

As described in the background, FIG. 1 is a diagram illustrating the structure of a shift register unit in the related art. As shown in FIG. 1, the shift register unit 01' includes an initial control module 011', a stage transmission output module 012', a driving control module 013', and a driving output module 014'. The initial control module 011' at least receives an input signal Vin' and a first clock signal ck1' and controls a signal of a first initial node N1' and a signal of a second initial node N2'. The stage transmission output module 012' receives the signal of the first initial node N1' and the signal of the second initial node N2' and outputs a stage transmission signal Vnext'. The stage transmission signal Vnext' may be used as an input signal of the next stage shift register unit 01'. The driving control module 013' receives the stage transmission signal Vnext' and a driving control signal Vct' and is configured to control a signal of a driving node N3'. The driving output module 014' receives the signal of the driving node N3' and the signal of the second initial node N2' and outputs a gate driving signal Gout'.

When high-frequency display is performed, the driving control signal Vct' in the shift register unit 01' corresponding to a high-frequency display area may be maintained at an enable level so that the frequency at which the gate driving signal Gout' of the shift register unit 01' and the stage transmission signal Vnext' reach the active level is the same. That is, when the stage transmission signal Vnext' is at an active level, the driving node N3 is at an enable level so that the driving output module 014' outputs the active level of the gate driving signal Gout', thereby performing high-frequency refresh on the pixel to achieve high-frequency display. When the driving control signal Vct' in the shift register 01' during low-frequency display may be at a non-enable level. In this case, regardless of whether the stage transmission signal Vnext' is at an active level or an inactive level, the driving node N3 is maintained at a non-enable level so that the driving output module 014' cannot output the active level of the gate driving signal Gout'. Thus, the scan signal Gout' provided to the pixel circuit has a reduced frequency of occurrence of its enable level, thereby achieving low-frequency display.

Figure 2:
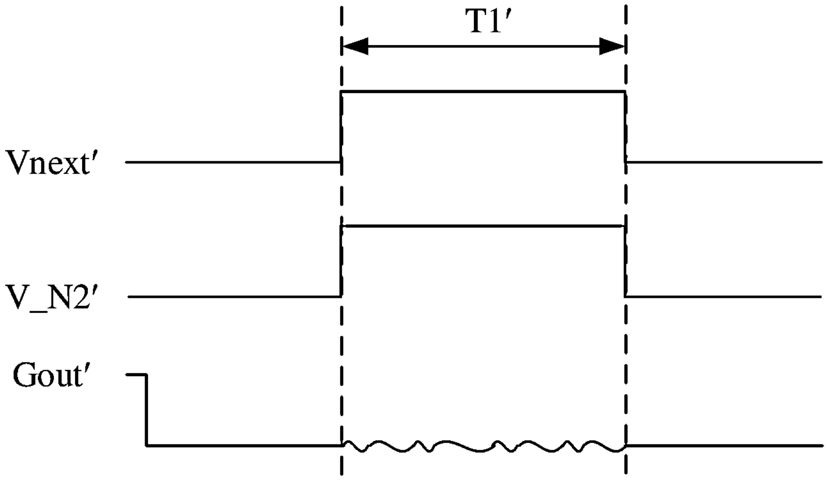
FIG. 2 is a signal timing diagram of a shift register unit in the related art.

FIG. 2 is a signal timing diagram of a shift register unit in the related art. With reference to FIG. 1 and FIG. 2, during low-frequency display, in the T1' phase of the shift register unit 01', when the signal V_N2' of the second initial node N2' is at a non-enable level and the signal of the first initial node N1' is at an enable level, causing the stage transmission signal Vnext' to be at an active level, the gate driving signal Gout' output by the driving output module 014' can only be maintained at an inactive level based on the previous potential. At this phase, the gate driving signal Gout' can only be an inactive signal. Although the gate driving signal may continue to be maintained at an inactive level, the gate driving signal is very susceptible to the influence of other signals. For example, parasitic capacitance exists between the signal line transmitting the gate driving signal Gout' and other signal lines or components. The coupling effect of the parasitic capacitance causes the potential of the gate driving signal Gout' to fluctuate, affecting the display effect of the display panel.

To solve the above technical problems, an embodiment of the present invention provides a display panel. The display panel includes a driver circuit. The driver circuit includes N-stage cascaded shift register units. A shift register unit includes an initial control module, a stage transmission output module, a driving control module, an active auxiliary module, and a driving output module. In the same shift register unit, the initial control module is configured to at least receive an input signal and a first clock signal and control a signal of a first initial node and a signal of a second initial node. The stage transmission output module is configured to at least receive the signal of the first initial node and the signal of the second initial node and control a stage transmission signal. The driving control module is configured to at least receive the signal of the first initial node, the signal of the second initial node, and a driving control signal and control a signal of a first driving node. The driving output module is configured to at least receive the signal of the first driving node and the signal of the first initial node and control a signal of a driving output node, where the driving output node is configured to output a gate driving signal. The active auxiliary module is configured to receive the signal of the first driving node and the first level signal and control the signal transmission path of the first level signal to the driving output node. A stage transmission signal of the i-th stage shift register unit is an input signal of the j-th stage shift register unit, where i, j, and N are each a positive integer, i≠j, i≤N, and j≤N.

By adopting the above technical solution, the stage transmission signal output from the stage transmission output module of each shift register unit is used as the input signal for other shift register units, the driving output module is controlled to output the gate driving signal through the driving control module, and the gate driving signal is used as the driving signal of the pixel circuit in the display panel. Therefore, the initial output signal and the gate driving signal output by the same shift register unit to other stages are independent of each other and do not affect each other. This arrangement ensures that the signal can be transmitted and shifted between shift register units, and the polarity of the gate output signal provided to the pixel circuit can be flexibly controlled. As a result, the driving methods of the pixel circuits in different rows of the display panel can be either the same or different, thereby meeting the diversified display needs and broadening the application scenarios of the display panel. For example, different regions of the display panel can have different refresh rates. On this basis, when the driving control signal and the first initial node are both at a non-enable level, the active auxiliary module provides a first-level signal to the driving output node, causing the gate driving signal output from the driving output node to remain active during the phase when the driving control signal stays at a non-enable level. In this manner, the active gate driving signal is less susceptible to interference from other signals, improving the stability of the gate driving signal. The gate driving signal is prevented from floating and generating significant fluctuations due to the influence of parasitic capacitance. Thus, the display effect of the display panel is effectively enhanced.

The preceding is the core idea of the present invention. Based on the embodiments of the present invention, all other embodiments acquired by those of ordinary skill in the art are within the scope of the present invention on the premise that no creative work is done. Technical solutions in embodiments of the present invention are described clearly and completely hereinafter in conjunction with the drawings in the embodiments of the present invention.

Figure 3:
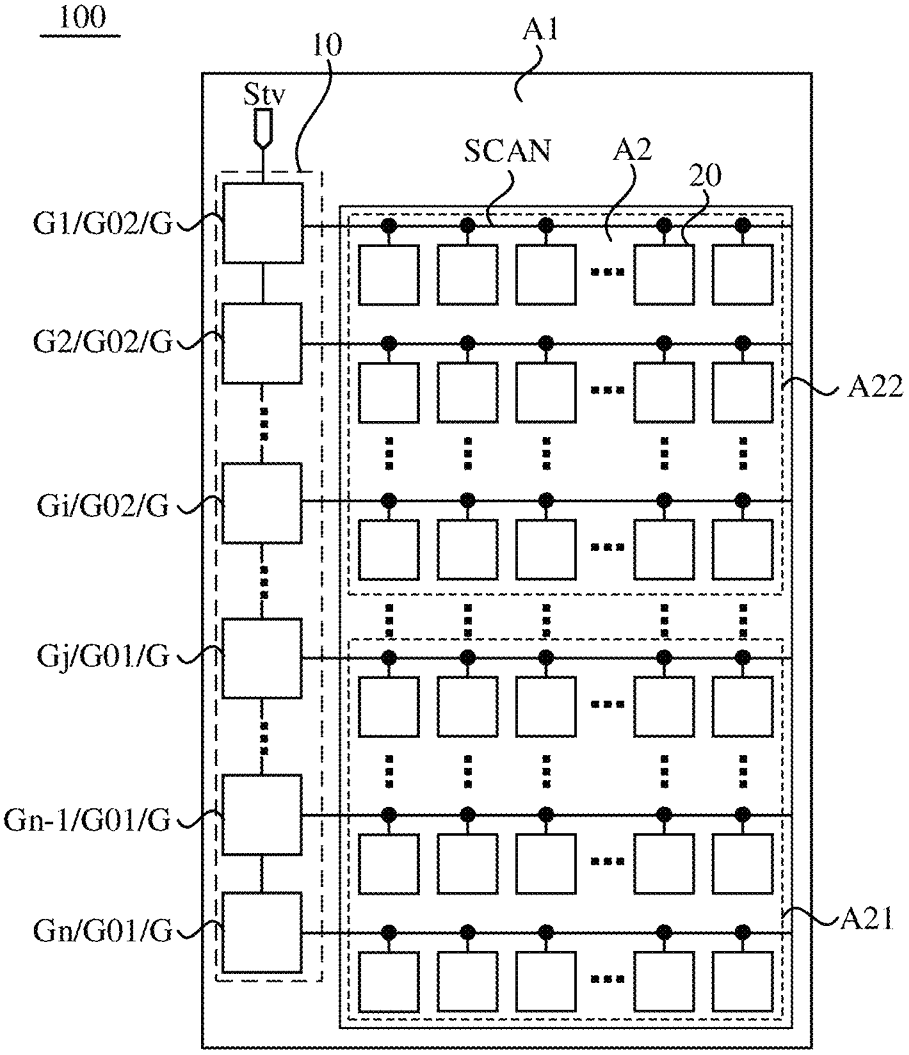
FIG. 3 is a diagram illustrating the structure of a display panel according to an embodiment of the present invention.
Figure 4:
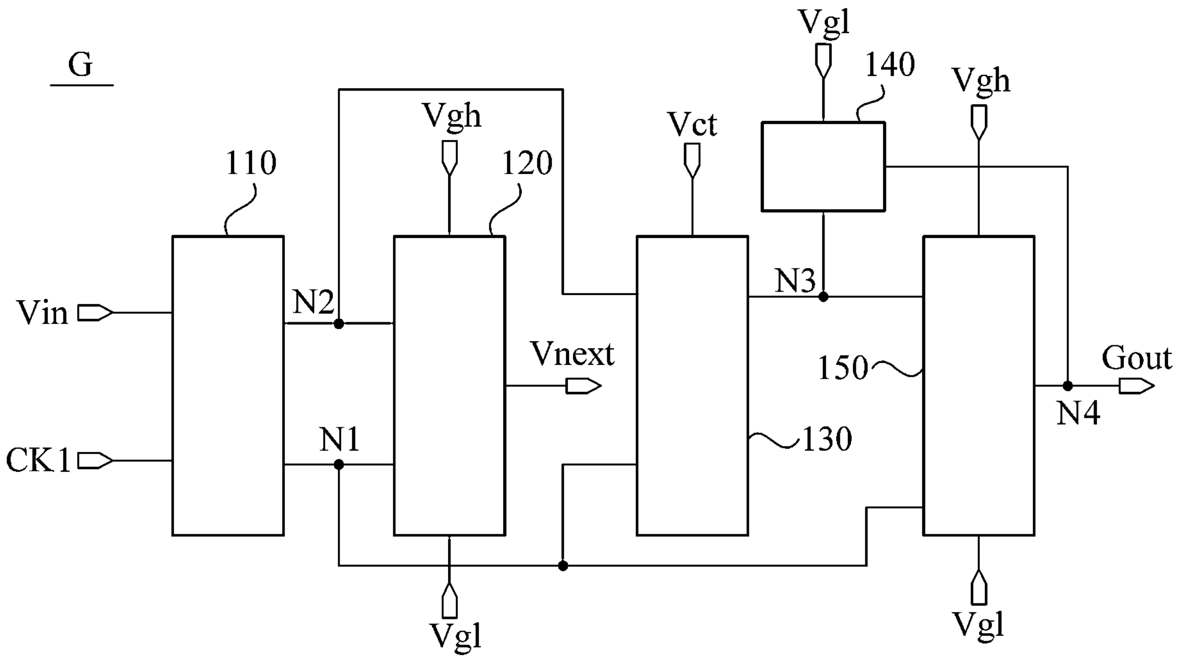
FIG. 4 is a diagram illustrating the structure of a shift register unit according to an embodiment of the present invention.

FIG. 3 is a diagram illustrating the structure of a display panel according to an embodiment of the present invention. FIG. 4 is a diagram illustrating the structure of a shift register unit according to an embodiment of the present invention. With reference to FIG. 3 and FIG. 4, the display panel 100 includes a driver circuit 10; the driver circuit 10 includes N-stage cascaded shift register units G (G1, G2, . . . , Gi, . . . , Gj, . . . , Gn−1, Gn); a shift register unit G includes an initial control module 110, a stage transmission output module 120, a driving control module 130, an active auxiliary module 140, and a driving output module 150; in the same shift register unit G, the initial control module 110 is configured to at least receive an input signal Vin and a first clock signal CK1 and control a signal of a first initial node N1 and a signal of a second initial node N2; the stage transmission output module 120 is configured to at least receive the signal of the first initial node N1, the signal of the second initial node N2, a first level signal Vgl, and a second level signal Vgh and control a stage transmission signal Vnext; the driving control module 130 is configured to at least receive the signal of the first initial node N1, the signal of the second initial node N2, and a driving control signal Vct and control a signal of a first driving node N3; the driving output module 150 is configured to at least receive the signal of the first driving node N3, the signal of the first initial node N1, the first level signal Vgl, and the second level signal Vgh and control a signal of a driving output node N4, where the driving output node N4 is configured to output a gate driving signal Gout; the active auxiliary module 140 is configured to receive the signal of the first driving node N3 and the first level signal Vgl and control the signal transmission path of the first level signal Vgl to the driving output node N4; a stage transmission signal Vnext of the i-th stage shift register unit Gi is an input signal of the j-th stage shift register unit Gj, where i, j, and N are each a positive integer, i≠j, i≤N, and j≤N.

It should be noted that the above is only an exemplary illustration, with the driver circuit 10 located in the non-display area A1 and the pixel circuit 20 located in the display area A2. In other embodiments of the present invention, the pixel circuit 20 and driver circuit 10 may both be located in the display area A2 so that the number of devices arranged in the non-display area A1 of the display panel 100 is minimized to reduce the size of the non-display area A1 of the display panel 100, thereby contributing to a narrower bezel of the display panel 100 and increasing the screen-to-body ratio of the display panel 100.

For ease of description, unless otherwise specifically defined, the embodiments of the present invention illustratively describe the technical solutions of the embodiments of the present invention, with an example where the driver circuit 10 is located in the non-display area A1 of the display panel 100 and the pixel circuit 20 is located in the display area A2 of the display panel 100.

With continued reference to FIG. 3 and FIG. 4, the output terminal of the stage transmission output module 120 of the x-th stage shift register unit Gx may be electrically connected to the input terminal of the initial control module 110 of the y-th stage shift register unit Gy so that the stage transmission signal Vnext output by the stage transmission output module 120 of the x-th stage shift register unit Gx may be the input signal Vin of the initial control module 110 of the y-th stage shift register unit Gy. The x-th stage shift register unit Gx and the y-th stage shift register unit Gy may be two adjacent stages of shift register units. In this case, if x is equal to i, y may be equal to i+1. Alternatively, the x-th stage shift register unit Gx and the y-th stage shift register unit Gy may also be two non-adjacent stages of shift register units. In this case, y-x may be a positive integer greater than or equal to 2. On the premise that the core invention point of the embodiments of the present invention can be implemented, the values of x and y in the embodiment of the present invention are not specifically limited.

For ease of description, unless otherwise specifically defined, the embodiments of the present invention illustratively describe the technical solutions of the embodiments of the present invention, with an example where the x-th stage shift register unit and the y-th stage shift register unit are two adjacent stages of shift register units.

With continued reference to FIGS. 3 and 4, in the same shift register unit G, the initial control module 110 and the stage transmission output module 120 may be both electrically connected to the first initial node N1 and the second initial node N2, the initial control module 110 may also be electrically connected to the driving control module 130 at the first initial node N1 and the second initial node N2, and the initial control module 110 may also be electrically connected to the driving output module 150 at the first initial node N1. The driving output module 150 is also electrically connected to the initial control module 110 at the first driving control node N3, and the active auxiliary module 140 is electrically connected to the first driving control node N3 and the driving output module 150. For the first-stage shift register unit G1, the input signal Vin received by the initial control module 110 of G1 may be a start signal Stv provided by a start control circuit (not shown in the figures) so that the first-stage shift register unit G1 can at least respond to the start signal Stv and the first clock signal CK1 and provide corresponding signals to the first initial node N1 and second initial node N2, respectively. For other-stage shift register units G except the first-stage shift register unit G1, the input terminal of the initial control module 110 of other-stage shift register units may be electrically connected to the output terminal of the stage transmission output module 120 of the previous-stage shift register unit G so that each stage of the shift register unit G can at least respond to the stage transmission signal Vnext and the first clock signal CK1 output by the initial output module 120 of the previous-stage shift register unit G to provide corresponding signals to the first initial node N1 and second initial node N2. In the same shift register unit G, the polarities of the signals of the first initial node N1 and the second initial node N2 may be the same or opposite. In an optional embodiment, at least part of the time, the polarities of the signals of the first initial node N1 and the second initial node N2 are opposite. That is, when the signal of the first initial node N1 is at a high level, the signal of the second initial node N2 may be at a low level; alternatively, when the signal of the first initial node N1 is at a low level, the signal of the second initial node N2 is at a high level.

Correspondingly, in the same shift register unit G, the stage transmission output module 120 may output the corresponding stage transmission signal Vnext based on the signal of the first initial node N1 and the signal of the second initial node N2 received by G. For example, when the signal of the first output node N1 is at an enable level, the initial output module 120 can output the first level signal Vgl as the initial output signal Vnext, and when the signal of the second output node N2 is at an enable level, the initial output module 120 can output the second level signal Vgh as the initial output signal Vnext.

The driving control module 130 may provide a corresponding signal to the first driving node N3 at least based on the signal of the first initial node N1, the signal of the second initial node N2, and the driving control signal Vct received by the driving control module 130. For example, when the driving control signal Vct is at an enable level, the driving control module 130 may transmit the signal of the second initial node N2 to the first driving node N3 under the control of the first initial node N1 so that the signal of the first driving node N3 is the same as the signal of the second initial node N2. When the driving control signal Vct is at a non-enable level, the driving control module 130 may control the signal transmission path between the second initial node N2 and the first driving node N3 to be disconnected under the control of the first initial node N1 so that the signal of the second initial node N2 cannot be transmitted to the first driving node N3, and at the same time, the signal of the first driving node N3 is maintained at a non-enable level. In this manner, by setting the driving control module 130 in the shift register unit G, the driving control module 130 controls the signal of the first driving node N3 at least based on the driving control signal Vct, the signal of the first initial node N1, and the signal of the second initial node N2 so that the signal of the first driving node N3 is simultaneously controlled by the driving control signal Vct, the signal of the first initial node N1, and the signal of the second initial node N2. Thus, the signal of the first driving node N3 can be the same as or different from the signal of the second initial node N2.

The driving output module 150 may output a corresponding gate driving signal Gout at least based on the received signal of the first driving node N3, the signal of the first initial node N1, the first level signal Vgl, and the second level signal Vgh. For example, when the signal of the first driving node N3 is at an enable level, the driving output module 150 may output the second level signal Vgh as the gate driving signal Gout; when the signal of the first initial node N1 is at an enable level, the driving output module 150 may output the first level signal Vgl as the gate driving signal Gout. In this manner, when the signal of the first driving node N3 is the same as the signal of the second initial node N2, the gate driving signal Gout output by the driving output module 150 is the same as the stage transmission signal Vnext output by the stage transmission output module 120, and when the signal of the first driving node N3 is different from the signal of the second initial node N2, the gate driving signal Gout output by the driving output module 150 may be different from the stage transmission signal Vnext output by the stage transmission output module 120. Thus, under the premise that the current-stage shift register unit G can provide a corresponding stage transmission signal Vnext to the next-stage shift register unit, ensuring the proper operation of the next-stage shift register unit G, the signal of the first driving node N3 of the current-stage shift register unit G can be controlled based on the display requirements, that is, the gate driving signal Gout output by the current-stage shift register unit G can be controlled based on the display requirements, thereby meeting the diversified display requirements of the display panel 100.

When the driving control signal Vct is at a non-enable level, the signal of the first driving node N3 remains at a non-enable level. In this case, if the signal of the first initial node N1 is at an enable level, the driving output module 150 outputs the received first level signal Vgl to the driving output node N4 as the gate driving signal Gout, and the gate driving signal Gout is a stable active signal. When the signal of the first initial node N1 is at a non-enable level, the active auxiliary module 140 can transmit the received first level signal Vgl to the driving output node N4 as the gate driving signal Gout under the control of the first driving node N3. In this manner, when the driving control signal Vct is the first-level signal Vgl, the driving control signal Vct is not synchronized with the stage transmission signal Vnext, that is, the gate driving signal Gout still outputs the first level signal Vgl when the stage transmission signal Vnext outputs the second level signal Vgh. When the second level signal Vgh is at an enable level that allows the pixel circuit 20 to refresh, the shift register unit G can stop outputting the enable level of the gate driving signal Gout to the pixel during the phase when the driving control signal Vct remains at a non-enable level, thus stopping the refresh of the pixel circuit 20 electrically connected to the shift register unit G. In this manner, the driving control signal Vct of the current-stage shift register unit G can be controlled based on the display requirements, which can meet the diversified display requirements of the display panel 100.

Moreover, in the case where the driving control signal Vct is at a non-enable level, when the signal of the first initial node N1 is at a non-enable level, the first level signal Vgl received by the active auxiliary module 140 is transmitted to the driving output node N4 as the gate driving signal Gout through the active auxiliary module 140 under the control of the first driving node N3 so that the gate driving signal Gout output by the driving output node N4 can always be maintained as an active signal at a phase when the driving control signal Vct is kept at a non-enable level. Compared with the related art in which the gate driving signal Gout is kept as the first level signal Vgl of the previous stage based on the previous potential when both the driving control signal Vct and the first initial node N1 are at a non-enable level, the active gate driving signal Gout is not easily interfered by other signals, which is conducive to improving the stability of the gate driving signal Gout.

It can be understood that the stage transmission signal Vnext and the gate driving signal Gout may both be pulse signals composed of a high level and a low level, and one of the high level and the low level is an enable level and the other is a non-enable level. When the stage transmission signal Vnext and the gate driving signal Gout output by the same shift register unit G are different, the stage transmission signal Vnext and the gate driving signal Gout output by the same shift register unit G may have different cycles, different durations of enable levels, and different numbers of pulses of the enable levels. The arrangement may be set as required, and the embodiment of the present invention does not impose specific limitations. One of the first level signal Vgl and the second level signal Vgh is a high level signal, and the other is a low level signal. For the sake of convenience, in the absence of special instructions, the following embodiments elaborate on the technical solutions of the present invention in detail, with an example where the first level signal Vgl is a low level signal, and the second level signal Vgh is a high level signal.

In addition, by setting a driving control module 130 in the shift register unit, the driving control module 130 controls the gate driving signal Gout output by the driving output module 150 through controlling the signal of the first driving node N3. Compared to the case where the driving output module 150 is directly electrically connected to the second initial node N2 and directly receives the driving control signal Vct, the presence of the driving control module 130 allows for isolation between the driving control signal Vct, the signal of the second initial node N2, and the signal of the first driving node N3. This configuration prevents fluctuations in the second initial node N2 and the driving control signal Vct from affecting the accuracy of the gate driving signal Gout output by the driving output module 150.

In the display panel provided by the embodiment of the present invention, the stage transmission signal output from the stage transmission output module of each shift register unit is used as the input signal for other shift register units, the driving output module is controlled to output the gate driving signal through the driving control module, and the gate driving signal is used as the driving signal of the pixel circuit in the display panel. Therefore, the initial output signal and the gate driving signal output by the same shift register unit to other stages are independent of each other and do not affect each other. This arrangement ensures that the signal can be transmitted and shifted between shift register units, and the polarity of the gate output signal provided to the pixel circuit can be flexibly controlled. As a result, the driving methods of the pixel circuits in different rows of the display panel can be either the same or different, thereby meeting the diversified display needs and broadening the application scenarios of the display panel. For example, different regions of the display panel can have different refresh rates. On this basis, when the driving control signal and the first initial node are both at a non-enable level, the active auxiliary module provides a first-level signal to the driving output node, causing the gate driving signal output from the driving output node to remain active during the phase when the driving control signal stays at a non-enable level. In this manner, the active gate driving signal is less susceptible to interference from other signals, improving the stability of the gate driving signal. The gate driving signal is prevented from floating and generating significant fluctuations due to the influence of parasitic capacitance. Thus, the display effect of the display panel is effectively enhanced.

Figure 5:
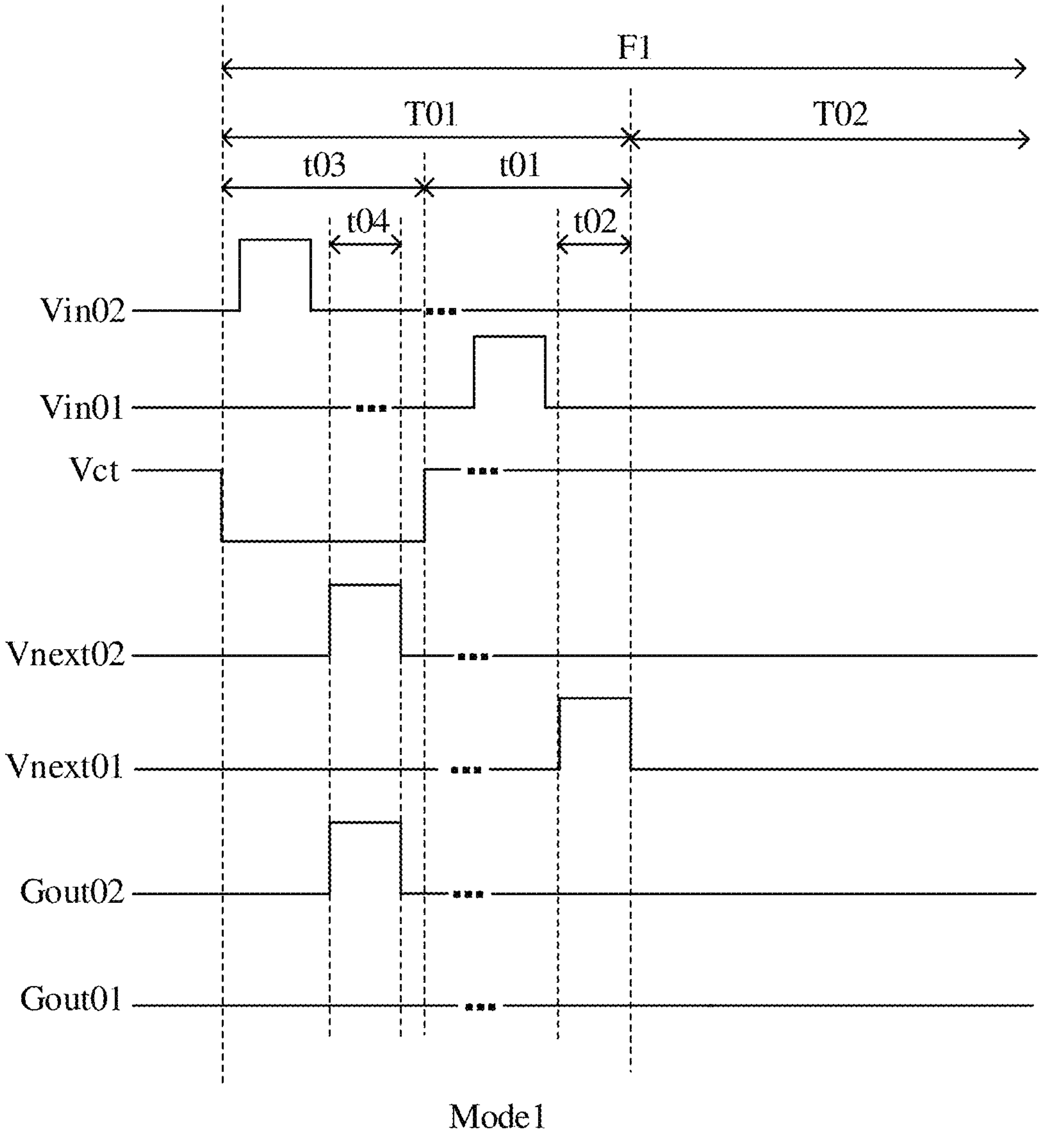
FIG. 5 is a driving timing diagram of a shift register unit according to an embodiment of the present invention.

In one or more embodiments, FIG. 5 is a driving timing diagram of a shift register unit according to an embodiment of the present invention. As shown in FIG. 5, the operating mode of the display panel 100 includes a first mode Mode1, and at least part of the display frames in the first mode Mode1 are first display frame F1; the first display frame F1 includes a refresh phase T01 and a hold phase T02; the driver circuit 10 includes at least one first shift register unit G01; in the refresh phase T01, the driving control signal Vct includes a non-enable level so that the stage transmission signal Vnext01 output by the first shift register unit G01 includes a second level Vgh, and the gate driving signal Gout01 is a first level Vgl. The second level Vgh may be an active level of the stage transmission signal Vnext and the gate driving signal Gout, and the second level Vgl may be an inactive level of the stage transmission signal and the gate driving signal Gout.

In the multi-frequency driving mode, different areas of the display panel 100 have different refresh frequencies. With reference to FIG. 3, the display area A2 may include a low-frequency display area A21 and a high-frequency display area A22. The refresh frequency of the pixel circuit 20 in the low-frequency display area A21 is less than the refresh frequency of the pixel circuit 20 in the high-frequency display area A22. At least part of the display frames in the multi-frequency driving mode are the first display frames F1. The first shift register unit G01 may be a shift register unit G electrically connected to the pixel circuit 20 in the low-frequency display area A21. In the first display frame F1, the gate driving signal Gout output by the first shift register unit G01 does not include a valid pulse so that the pixel circuit 20 in the low-frequency display area A21 does not perform signal refresh and maintains the grayscale of the previous display frame, while the signal of the pixel circuit 20 in the high-frequency display area A22 may be refreshed to the grayscale of the current display frame. The first display frame F1 includes a refresh phase T01 and a hold phase T02. The refresh phase T01 refers to a phase in which at least part of the shift register units G can output valid pulses of the gate driving signals Gout and control at least part of the pixel circuits 20 to perform signal refresh. The hold phase T01 refers to a phase in which the driver circuit 10 cannot output valid pulses of the gate driving signals Gout and can control each row of pixel circuits 20 to stop signal refresh and maintain the current grayscale display. In the refresh phase T01, the first shift register unit G01 can output a valid pulse of the stage transmission signal Vnext to drive the shift register units G at all stages. At the same time, the driving control signal Vct includes a non-enable level so that the gate driving signal Gout output by the first shift register unit G01 is maintained at the first level Vgl. In this manner, while the normal operation of shift register units G at all stages is ensured, the gate driving signal Gout01 output by the first shift register unit G01 does not refresh the pixel circuit 20 electrically connected to G01, enabling the pixel circuit 20 to maintain the grayscale of the previous display frame.

It should be noted that FIG. 5 is illustrative by using an example where the enable level of the stage transmission signal Vnext and the gate driving signal Gout is a high level, the non-enable level of the stage transmission signal Vnext and the gate driving signal Gout is a low level, the enable level of the driving control signal Vct is a low level, and the non-enable level of the driving control signal Vct is a high level. It can be understood that in other feasible embodiments of the present invention, it is also possible that the enable level of the stage transmission signal Vnext and the gate driving signal Gout is a low level, the non-enable level of the stage transmission signal Vnext and the gate driving signal Gout is a high level, the enable level of the driving control signal Vct is a high level, and the non-enable level of the driving control signal Vct is a low level. The embodiment of the present invention does not specifically limit the arrangement. For the convenience of explanation, in the absence of special instructions, the following embodiments elaborate on the technical solution of the present invention in detail, with an example where the enable level of the stage transmission signal Vnext and the gate driving signal Gout is a high level, the non-enable level of the stage transmission signal Vnext and the gate driving signal Gout is a low level, the enable level of the driving control signal Vct is a low level, and the non-enable level of the driving control signal Vct is a high level.

Figure 6:
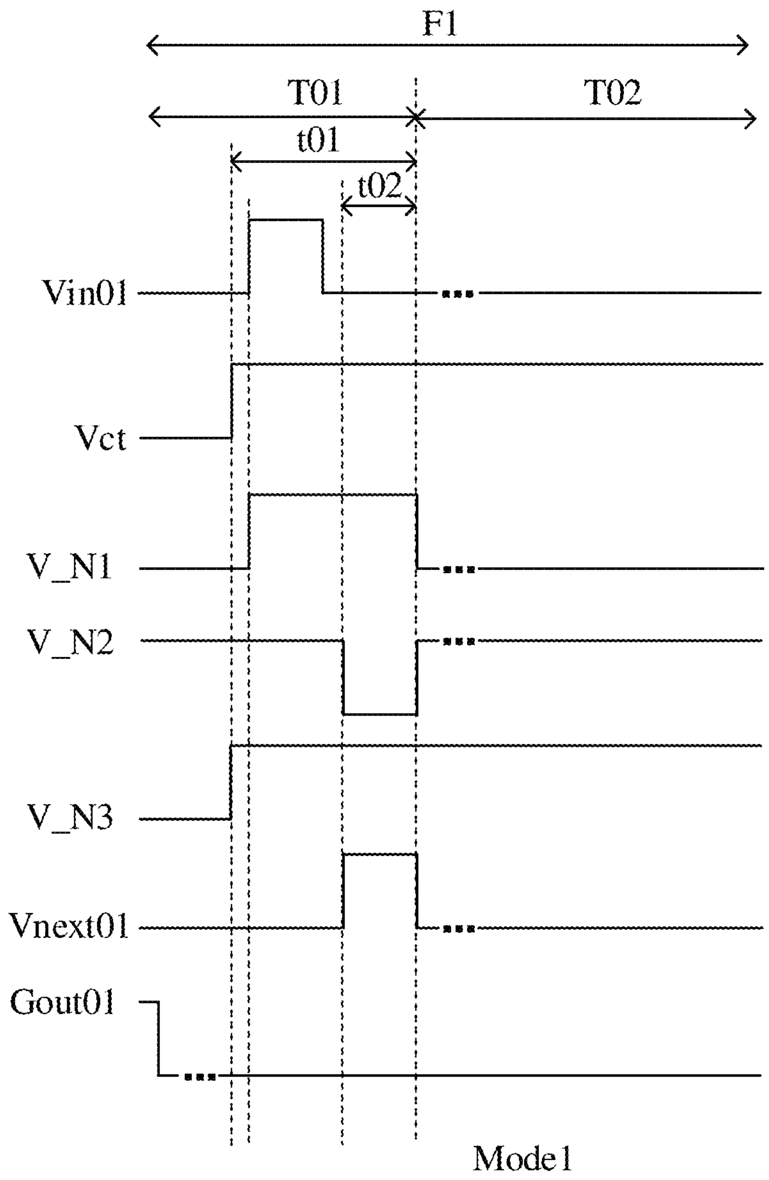
FIG. 6 is a driving timing diagram of another shift register unit according to an embodiment of the present invention.

In one or more embodiments, FIG. 6 is a driving timing diagram of another shift register unit according to an embodiment of the present invention. With reference to FIG. 4, FIG. 5, and FIG. 6, in the refresh phase T01, when the driving control signal Vct is at a non-enable level (t01 phase), the stage transmission signal Vnex01 output by the same first shift register unit G01 is at the second level Vgh, and when the gate driving signal Gout01 is at the first level Vgl (t02 phase), the signal V_N1 of the first initial node N1 is at a non-enable level, the signal V_N2 of the second initial node N2 is at an enable level, and the signal V_N3 of the first driving node N3 is at a non-enable level.

In one or more embodiments, in the same first shift register unit G01, when the signal of the second initial node N2 is at an enable level, the stage transmission output module 120 may be controlled to output the second level signal Vgh as the stage transmission signal Vnext01, that is, the stage transmission signal Vnext01 is at the second level Vgh. At the same time, the signal of the first initial node N1 is at a non-enable level so that the stage transmission output module 120 cannot output the first level signal Vgl. Thus, the stage transmission signal Vnext01 remains at the second level Vgh. Moreover, in the t01 phase when the transmission control signal Vct is at a non-enable level in the refresh phase T01, the signal of the first driving output node N3 is at a non-enable level so that the signal of the first driving node N3 is not synchronized with the signal of the second initial node N2, and the signal of the first driving node N3 can always be maintained at a non-enable level. Thus, the driving output module 150 stops outputting the second level signal Vgh to the driving output node N4.

In one or more embodiments, with continued reference to FIGS. 4, 5, and 6, when the signal of the first driving node N3 is at a non-enable level, the active auxiliary module 140 controls the transmission path of the first level signal Vgl to the driving output node N4 to be in an on state; when the signal of the first driving node N3 is at an enable level, the active auxiliary module 140 controls the signal transmission path of the first level signal Vgl to the driving output node N4 to be in an off state.

In one or more embodiments, when the signal of the first driving node N3 is at a non-enable level (such as in the t01 phase and the T02 phase), the driving output module 150 cannot output the second level signal Vgh to the driving output node N4. In this phase, the active auxiliary module 140 may output the first level signal Vgl to the driving output node N4 under the potential control of the first driving output node N3 so that the gate driving signal Gout output by the driving output node N4 is at the first level Vgl, thereby enabling the gate driving signal Gout output by the driving output node N3 to remain an active signal at all times, preventing the gate driving signal Gout from floating, and improving the stability of the gate driving signal Gout.

In one or more embodiments, with reference to FIGS. 3, 4, and 5, in the hold phase T02, the driving control signal Vct is at a non-enable level, and stage transmission signals Vnext and gate driving signals Gout output by each stage of shift register unit G are all at the first level Vgl.

In one or more embodiments, in the hold phase T02 of the first display frame F1, the stage transmission signals Vnext output by each stage of shift register unit G do not include the second level so that each stage of shift register unit G stops driving. At the same time, the driving control signal Vct is set to a non-enable level so that the gate driving signals Gout output by each stage of shift register unit G do not include the second level. Thus, each row of pixel circuits 20 in the display area A2 does not perform signal refresh, and each row of pixel circuits 20 maintains the grayscale display of the refresh phase T01.

In one or more embodiments, with continued reference to FIG. 3, FIG. 4, and FIG. 5, the driver circuit 10 also includes a second shift register unit G02; in the refresh phase T01 of the first display frame F1, the driving control signal Vct includes an enable level so that the stage transmission signal Vnext02 and the gate driving signal Gout02 output by the second shift register unit G02 both include the second level Vgh.

In one or more embodiments, in the refresh phase T01 of the first display frame F1, the stage transmission signals Vnext02 output by each stage of second shift register G02 include the second level Vgh to achieve the driving of each stage of the second shift register G02. The second shift register G02 may be electrically connected to the pixel circuit 20 of the high-frequency display area A22. In the refresh phase T01 of the first display frame F1, the driving control signal Vct is set to include an enable level (such as the t03 phase) so that the stage transmission signal Vnext02 output by the second shift register G02 includes the second level Vgh, and the gate driving signal Gout02 output by the second shift register G02 also includes the second level Vgh (such as the t04 phase). Thus, the signal of the pixel circuit 20 electrically connected to G02 can be refreshed. Thus, in the refresh phase T01, the stage transmission signals Vnext output by each second shift register unit G02 and the first shift register unit G01 include the second level Vgh so that each stage of shift register unit G normally outputs the effective pulse of the stage transmission signal Vnext, and the driving of each stage of shift register unit G is achieved. Moreover, the gate driving signals Gout02 output by each second shift register unit G02 include the second level Vgh, and the gate driving signal Gout01 output by the first shift register unit G01 always maintains the first level Vgl so that only the pixel circuit 20 electrically connected to the second shift register unit G02 performs signal refresh and displays with the refreshed grayscale, while the pixel circuit 20 electrically connected to the first shift register unit G01 does not perform signal refresh and maintains the grayscale of the previous display frame for display. In this manner, the pixel circuit 20 electrically connected to the second shift register unit G02 and the pixel circuit 20 electrically connected to the first shift register unit G01 have different signal refresh frequencies, achieving the diversified display function of the display panel.

Figure 7:
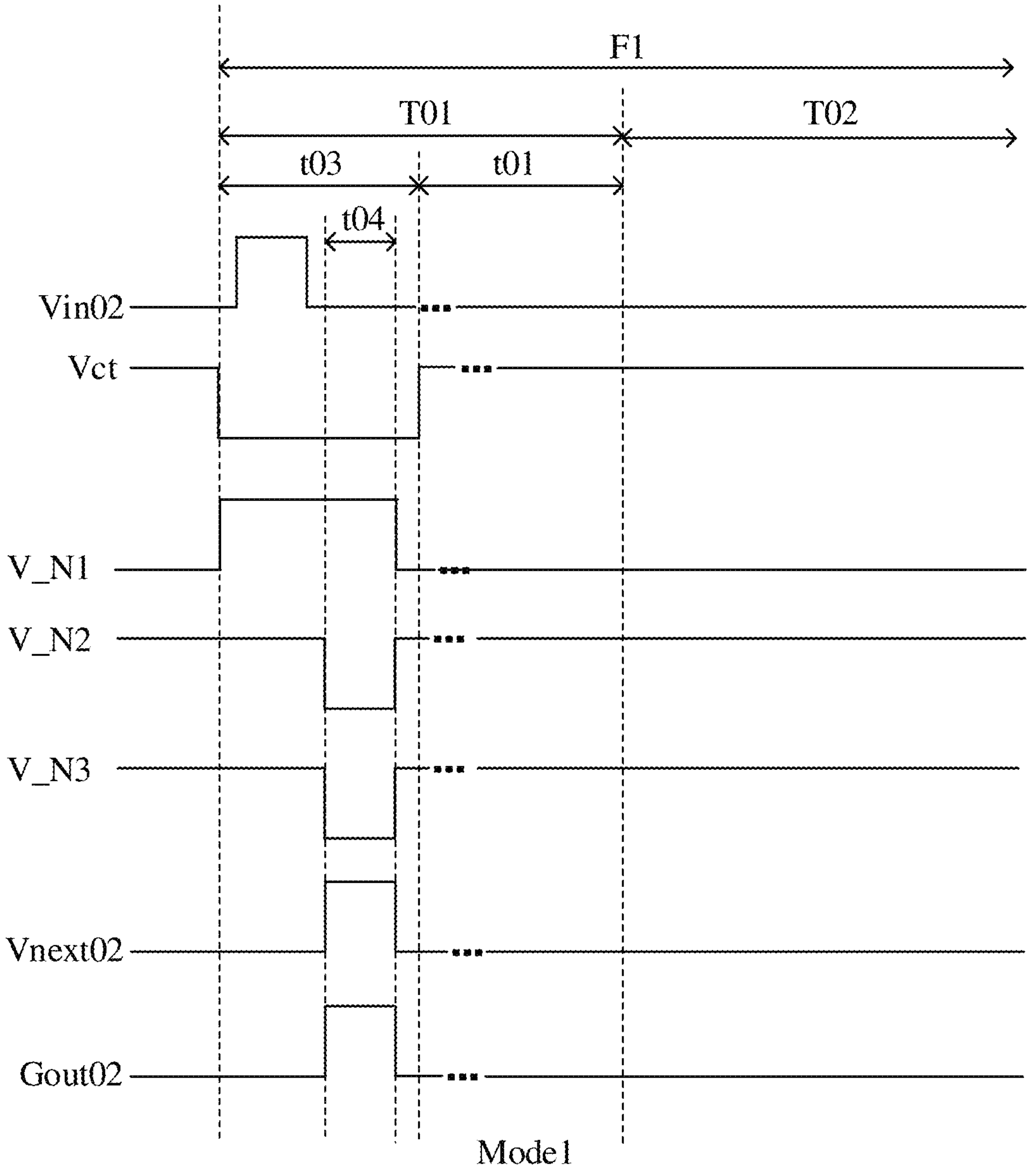
FIG. 7 is a driving timing diagram of still another shift register unit according to an embodiment of the present invention.

In one or more embodiments, FIG. 7 is a driving timing diagram of still another shift register unit according to an embodiment of the present invention. With reference to FIG. 4, FIG. 5, and FIG. 7, in the refresh phase T01, when the driving control signal Vct is at the enable level (t03 phase), the stage transmission signal Vnext02 and the gate driving signal Gout02 output by the same second shift register unit G02 are both at the second level Vgh, the signal of the first initial node N1 is at a non-enable level, the signal of the second initial node N2 is at an enable level, and the signal of the first driving node N3 is at an enable level.

In one or more embodiments, in the same second shift register unit G02, when the signal of the second initial node N2 is at an enable level, the stage transmission output module 120 may be controlled to output the second level signal Vgh as the stage transmission signal Vnext01, that is, the stage transmission signal Vnext01 is at the second level Vgh. At the same time, the signal of the first initial node N1 is at a non-enable level so that the stage transmission output module 120 cannot output the first level signal Vgl. Thus, the stage transmission signal Vnext01 remains at the second level Vgh, which can prevent the stage transmission output module 120 from outputting signals of two levels at the same time, thereby preventing signal collision from damaging the circuit. Moreover, in the refresh phase T01, when the control signal Vct is at the enable level during phase t03, the signal of the first driving output node N3 may be made the same as the signal of the second initial node N2. As a result, when the signal of the second initial node N2 is at the enable level during phase t04, the signal of the first driving node N3 is also at the enable level. Then, when the stage transmission signal Vnext01 is at the second level Vgh, the driving output module 150 can output the second level signal Vgh to the driving output node N4 under the control of the first driving node N3 so that the gate driving signal Gout02 is at the second level Vgh. That is, in the refresh phase T01, when the driving control signal Vct is at the enable level, the second shift register unit G02 simultaneously outputs the effective pulses of the stage transmission signal Vnext02 and the gate driving signal Gout02, which not only drives the next shift register unit G but also refreshes the signal of the pixel circuit 20 electrically connected to G02, thus achieving a higher refresh frequency.

Figure 8:
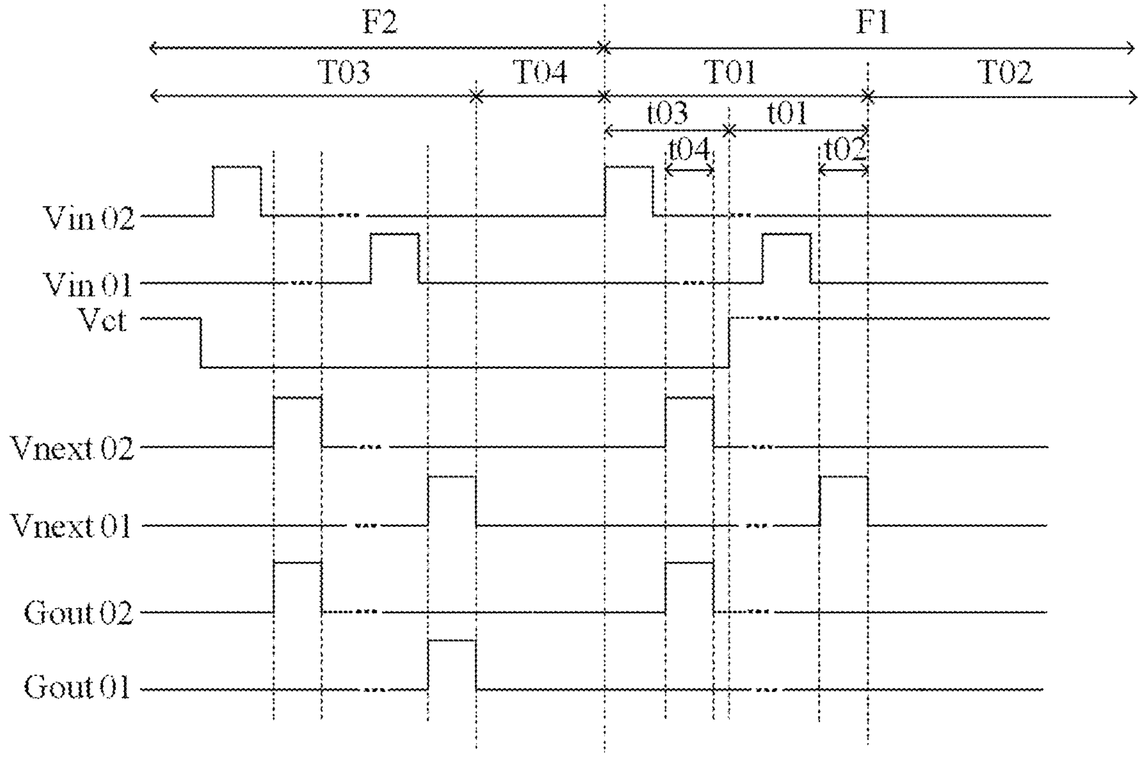
FIG. 8 is a driving timing diagram of still another shift register unit according to an embodiment of the present invention.

In one or more embodiments, FIG. 8 is a driving timing diagram of still another shift register unit according to an embodiment of the present invention. As shown in FIG. 8, part of the display frames of the first mode Mode1 are second display frames F2; in a second display frame F2, both the stage transmission signal Vnext01 and the gate driving signal Gout01 output by the first shift register unit G01 include the second level Vgh, and both the stage transmission signal Vnext02 and the gate driving signal Gout02 output by the second shift register unit G02 include the second level Vgh; the first mode Mode1 includes multiple display cycles; a display cycle includes at least one first display frame F1 and at least one second display frame F2, where the second display frame F2 is before the first display frame F1.

In one or more embodiments, in the refresh phase T03 of the second display frame F2 in the first mode Mode1, both the stage transmission signal Vnext01 and the gate driving signal Gout01 output by the first shift register unit G01 include the second level Vgh to drive the shift register units G at all stages; at the same time, both the stage transmission signal Vnext02 and the gate driving signal Gout02 output by the second shift register unit G02 include the second level Vgh so that the pixel circuit 20 in the high-frequency display area A22 and the pixel circuit 20 in the low-frequency display area A21 can both perform signal refresh. Thus, the second display frame F2 is before the first display frame F1. After the pixel circuit 20 in the high-frequency display area A22 and the pixel circuit 20 in the low-frequency display area A21 are both refreshed in the second display frame F2, only the pixel circuit 20 in the high-frequency display area A22 is refreshed in the first display frame F1 to display the rewritten grayscale data, while the pixel circuit 20 in the low-frequency display area A21 is not refreshed and is maintained in the grayscale of the second display frame F2.

In one or more embodiments, an example is used where the display cycle includes a second display frame F2 and a first display frame F1. With continued reference to FIGS. 3 and 8, the pixel circuits 20 in the high-frequency display area A22 can refresh the signal and rewrite the data signal in each display frame, while the pixel circuits 20 in the low-frequency display area A21 can only refresh the signal and rewrite the data signal in the second display frame F2. In this manner, the signal refresh frequency of the pixel circuits 20 in the high-frequency display area A22 is twice the signal refresh frequency of the pixel circuits 20 in the low-frequency display area A21.

It can be understood that when the display cycle includes a second display frame and d first display frames, the signal refresh frequency of the pixel circuit 20 located in the low-frequency display area A21 is f1, the signal refresh frequency of the pixel circuit 20 located in the high-frequency display area A22 is f2, and then f1/f2=1/(d+1).

Figure 9:
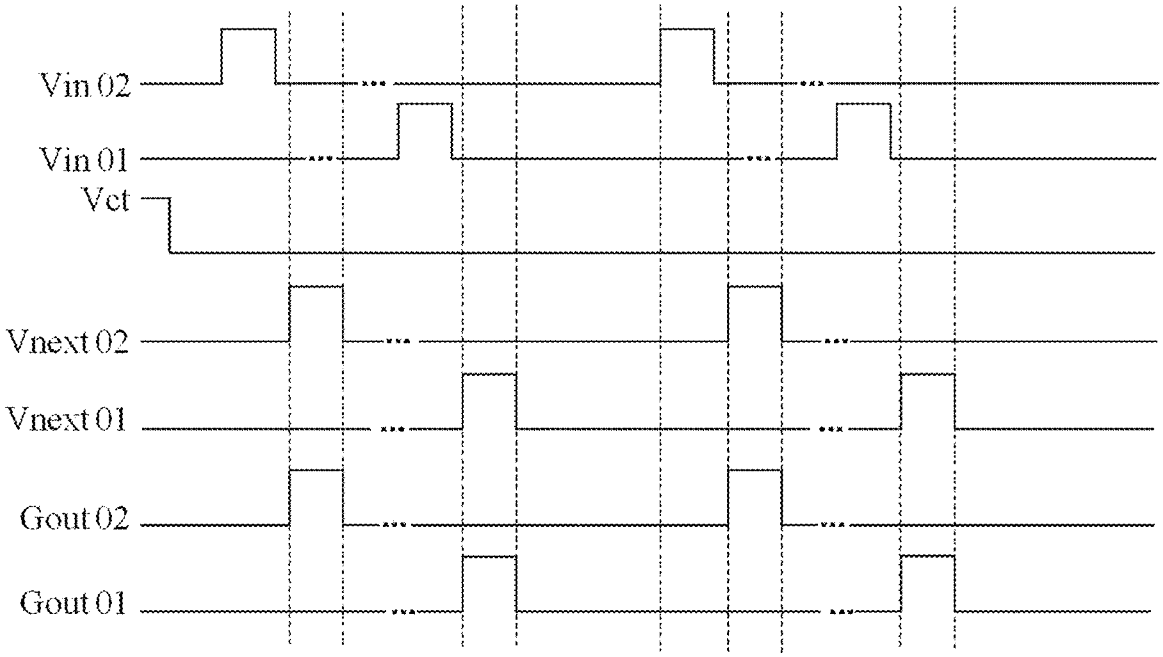
FIG. 9 is a driving timing diagram of still another shift register unit according to an embodiment of the present invention.

In one or more embodiments, FIG. 9 is a driving timing diagram of still another shift register unit according to an embodiment of the present invention. As shown in FIG. 9, the operating mode of the display panel 100 includes a second mode Mode2; in the second mode Mode2, the frequency of the stage transmission signal Vnext01 output by the first shift register unit G01 is equal to the frequency of the gate driving signal Gout01, the frequency of the stage transmission signal Vnext02 output by the second shift register unit G02 is equal to the frequency of the gate driving signal Gout02, and the frequency of the gate driving signal Gout01 output by the first shift register unit G01 is equal to the frequency of the gate driving signal Gout02 output by the second shift register unit G02.

In one or more embodiments, in the second mode Mode2, the refresh frequency of each area of the display panel 100 may be the same, and the frequency of the effective pulse of the gate driving signal Gout01 of each stage of shift register unit G is the same so that the refresh frequencies of each row of pixel circuits 20 in the display area A2 are the same. The second mode Mode2 may be a global high-frequency display mode, and the frequency of the gate driving signal Gout of each stage of shift register unit G may be the same as the frequency of the stage transmission signal Vnext, that is, the frequency of the effective pulse of the gate driving signal Gout is the same as the frequency of the effective pulse of the stage transmission signal Vnext to achieve high-frequency refresh of each row of pixel circuits 20 in the display area A2.

In one or more embodiments, with reference to FIG. 9, in the second mode Mode2, the driving control signal Vct is maintained at the enable level. In this manner, when outputting the effective pulse of the stage transmission signal Vnext, each stage of shift register unit G can simultaneously output the effective pulse of the gate driving signal Gout and can perform signal refresh on the pixel circuit 20 electrically connected to itself while driving the next stage of shift register unit G. Thus, high-frequency refresh of each row of pixel circuits 20 in the display area A2 is achieved.

It should be noted that in the shift register unit, the initial control module at least receives the input signal and the first clock signal to control the signals of the first initial node and the second initial node, the stage transmission output module at least receives the signals of the first initial node and the second initial node, the driving control module at least receives the signal of the first initial node and the driving control signal to control the signal of the first driving node, and the driving output module at least receives the signals of the first driving node and the first initial node; therefore, the input signal and the first clock signal control the signals of the first initial node and the second initial node, the signals of the first initial node and the second initial node can control the stage transmission signal output by the stage transmission output module, the first initial node and the driving control signal can control the signal of the first driving node, and the first driving node and the first initial node can control the gate driving signal output by the driving output module. The stage transmission signal and the gate driving signal may be the same or different, which is related to the specific structures of the stage transmission output module, the driving control module, and the driving output module. The following is an exemplary description of the structures of the initial control module, the stage transmission output module, the driving control module, and the driving output module with a typical example.

Figure 10:
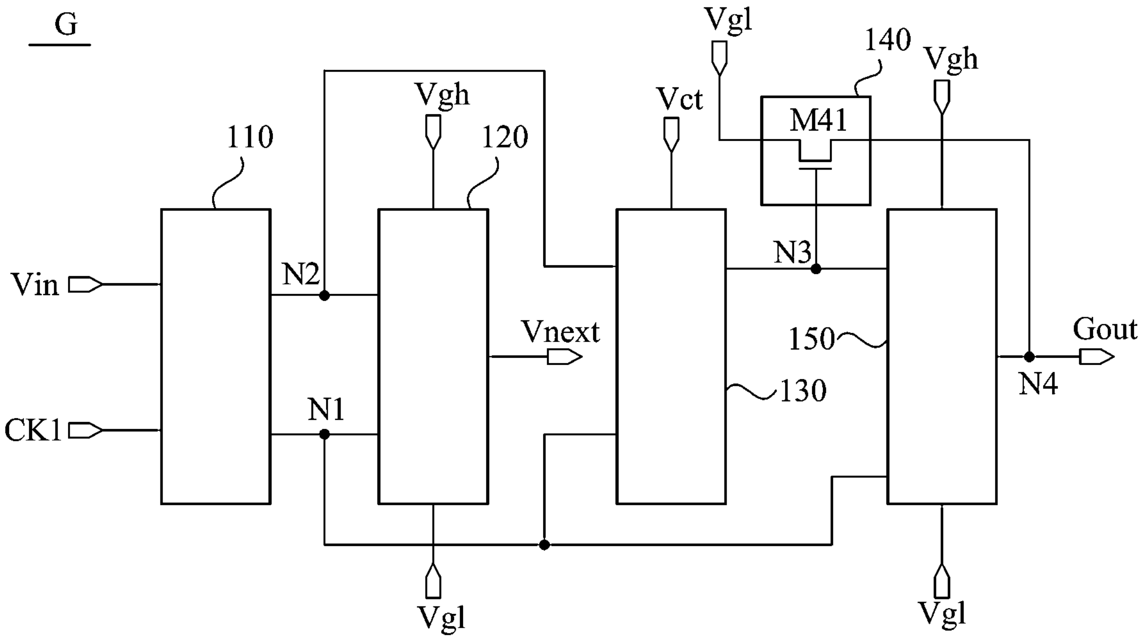
FIG. 10 is a diagram illustrating the structure of another shift register unit according to an embodiment of the present invention.

In one or more embodiments, FIG. 10 is a diagram illustrating the structure of another shift register unit according to an embodiment of the present invention. As shown in FIG. 10, the active auxiliary module 140 includes an active auxiliary transistor M41; a gate of the active auxiliary transistor M41 is electrically connected to the first driving node N3, a first electrode of the active auxiliary transistor M41 receives the first level signal Vgl, and a second electrode of the active auxiliary transistor M41 is electrically connected to the driving output node N4.

In one or more embodiments, the active auxiliary transistor M41 can be turned on or off under the potential control of the first driving node N3. When the first driving node N3 is at a non-enable level, causing the driving output module 150 to be unable to output the second level signal Vgh to the driving output node N4, the active auxiliary transistor M41 is turned on under the potential control of the first driving node N3. Thus, the active auxiliary transistor M41 outputs the first level signal Vgl to the driving output node N4, and the gate driving signal Gout is the first level signal Vgl. When the first driving node N3 is at an enable level that makes the driving output module 150 output the second level signal Vgh as the gate driving signal Gout, the active auxiliary transistor M41 is disconnected under the potential control of the first driving node N3. Thus, the active auxiliary transistor M41 cannot transmit the first level signal Vgl to the driving output node N4, and the gate driving signal Gout remains as the second level signal Vgh.

In one or more embodiments, the active auxiliary transistor M41 may be an N-type MOS transistor or a P-type MOS transistor. When the active auxiliary transistor M41 is an N-type MOS transistor, the enable level of the first driving node N3 is a low level, and the non-enable level is a high level. That is, when the first driving node N3 is at a high level, the control driving output module 150 cannot output the second level signal Vgh to the driving output node N4, and the active auxiliary transistor M41 is controlled to be turned on so that the driving output node N4 outputs the first level signal Vgl as the gate driving signal Gout; when the first driving node N3 is at a low level, the control driving output module 150 outputs the second level signal Vgh to the driving output node N4 as the gate driving signal Gout, and the active auxiliary transistor M41 is controlled to be turned off so that the active auxiliary transistor M41 cannot output the first level signal Vgl to the driving output node N4. Alternatively, when the active auxiliary transistor M41 is a P-type MOS transistor, the enable level of the first driving node N3 is a high level, and the non-enable level is a low level. That is, when the first driving node N3 is at a high level, the control driving output module 150 outputs the second level signal Vgh to the driving output node N4 and controls the active auxiliary transistor M41 to be turned off so that the gate driving signal Gout is the second level signal Vgh; when the first driving node N3 is at a low level, the control driving output module 150 cannot output the second level signal Vgh to the driving output node N4, and the active auxiliary transistor M41 is controlled to be turned on so that the gate driving signal Gout is the first level signal Vgl. The embodiment of the present invention does not specifically limit the channel type of the active auxiliary transistor M41. In the absence of specific instructions, the embodiment of the present invention takes the active auxiliary transistor M41 as a P-type MOS transistor for illustrative explanation.

Figure 11:
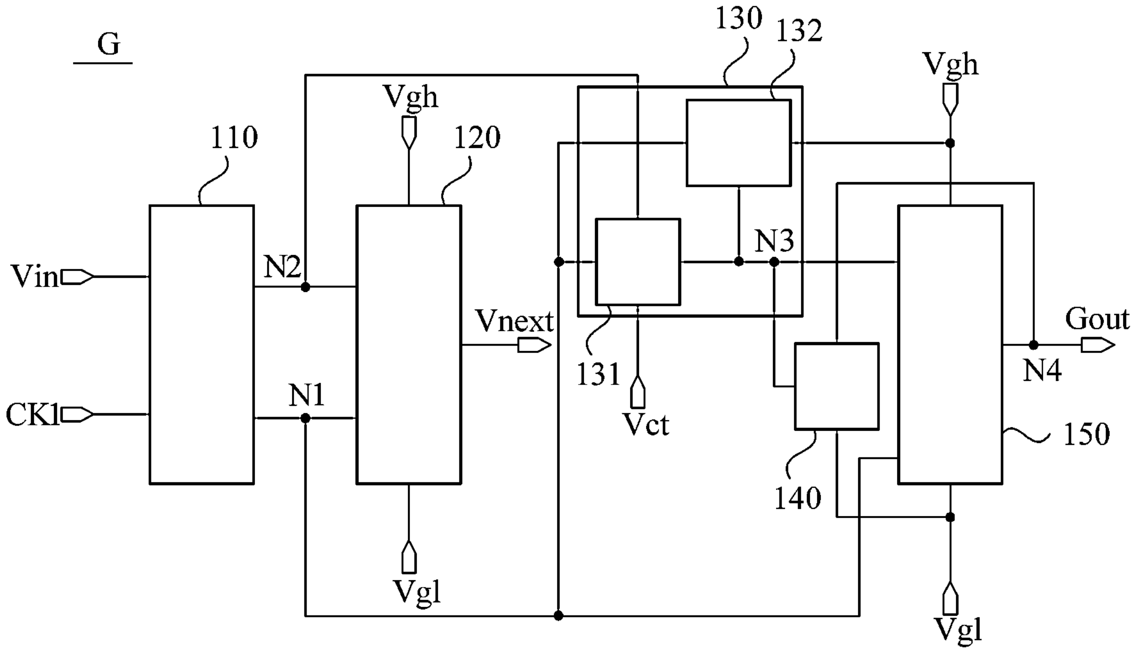
FIG. 11 is a diagram illustrating the structure of still another shift register unit according to an embodiment of the present invention.

In one or more embodiments, FIG. 11 is a diagram illustrating the structure of still another shift register unit according to an embodiment of the present invention. As shown in FIG. 11, the driving control module 130 includes a first driving control unit 131 and a second driving control unit 132; the first driving control unit 131 is configured to receive the driving control signal Vct, the signal of the first initial node N1, and the signal of the second initial node N2 and control the signal of the first driving node N3; the second driving control unit 132 is configured to receive the signal of the first initial node N1 and the second level signal Vgh and control the signal of the first driving node N3.

In one or more embodiments, the first driving control unit 131 may control the signal transmission path between the second initial node N2 and the first driving node N3 under the joint action of the first initial node N1 and the driving control signal Vct. In an example embodiment, when the first initial node N1 and the driving control signal Vct are both at the enable level, the signal transmission path between the second initial node N2 and the first driving node N3 may be controlled to be turned on so that the signal of the first driving node N3 is the same as the signal of the second initial node N2. The second driving control unit 132 can control the signal transmission path of the second level signal Vgh to the first driving node N3 under the control of the first initial node N1. For example, when the first initial node N1 is at the enable level, enabling the driving output module 150 to output the first level signal Vgl as the gate driving signal Gout, the second driving control unit 132 is controlled to be turned on so that the second level signal Vgh is transmitted to the first driving node N3; when the first initial node N1 is at the non-enable level, causing the driving output module 150 to be unable to output the first level signal Vgl to the driving output node N4, the second driving control unit 132 is controlled to be turned off so that the second level signal Vgh cannot be transmitted to the first driving node N3. In this manner, the signal of the first driving node N3 can be controlled based on the signal of the first initial node N1 and the driving control signal Vct.

Figure 12:
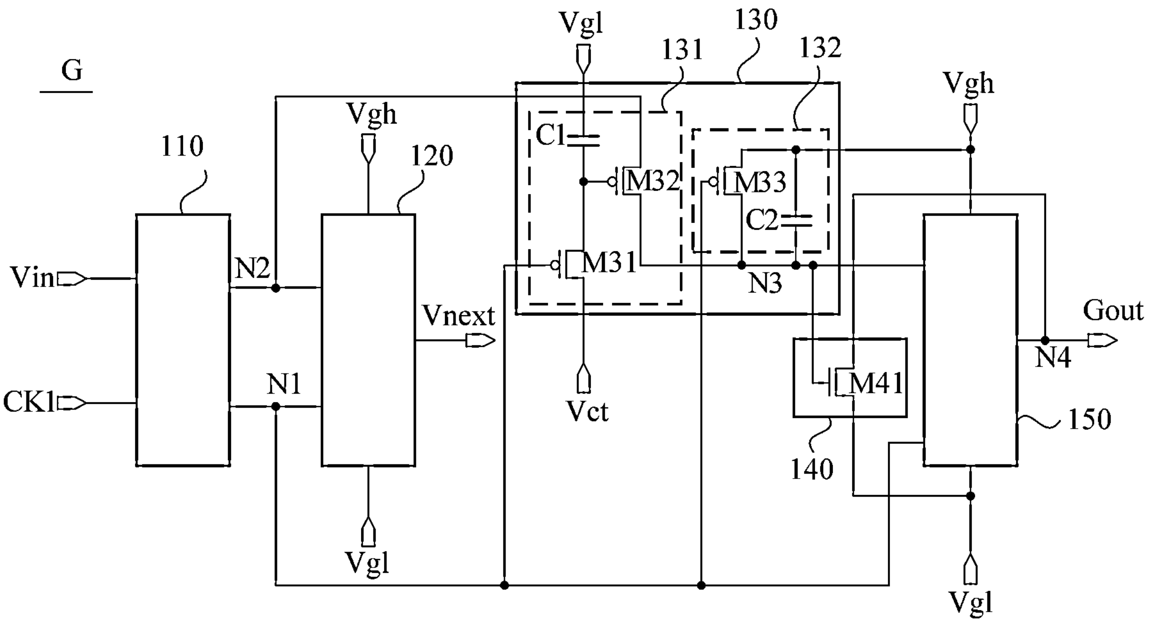
FIG. 12 is a diagram illustrating the structure of still another shift register unit according to an embodiment of the present invention.

In one or more embodiments, FIG. 12 is a diagram illustrating the structure of still another shift register unit according to an embodiment of the present invention. As shown in FIG. 12, the first driving control unit 131 includes a first driving control transistor M31, a second driving control transistor M32, and a first storage capacitor C1; a gate of the first driving control transistor M31 is electrically connected to the first initial node N1, and a first electrode of the first driving control transistor M31 receives the driving control signal Vct; a gate of the second driving control transistor M32 is electrically connected to a second electrode of the first driving control transistor M31 and a first plate of the first storage capacitor C1, a first electrode of the second driving control transistor M32 is electrically connected to the second initial node N2, and a second electrode of the second driving control transistor M32 is electrically connected to the first driving node N3; a second plate of the first storage capacitor C1 receives a fixed signal.

In one or more embodiments, when the first initial node N1 is at an enable level, the first driving control transistor M31 is turned on, and the driving control signal Vct may be transmitted to the gate of the second driving control transistor M32. If the driving control signal Vct is an enable signal at this time, the second driving control transistor M32 may be controlled to be turned on so that the signal of the second initial node N2 is transmitted to the first driving node N3 through the second driving control transistor M32. Therefore, when it is necessary to synchronize the signal of the first driving node N3 with the signal of the second initial node N2, the driving control signal Vct may be controlled to be at an enable level when the signal of the first initial node N1 is at an enable level so that the signal transmission path between the second initial node N2 and the first driving node N3 can be controlled to be turned on. Conversely, when it is necessary to isolate the signal of the first driving node N3 from the signal of the second initial node N2, the driving control signal Vct may be controlled to be at a non-enable level when the signal of the first initial node N1 is at an enable level so that the second driving control transistor M32 can be controlled to be turned off. Thus, the signal of the second initial node N2 and the signal of the first driving node N3 are isolated from each other and do not affect each other.

The first plate of the first storage capacitor C1 is electrically connected to the gate of the second driving control transistor M32, and the second plate of the first storage capacitor C1 may be electrically connected to a fixed signal terminal to receive a fixed signal. FIG. 12 exemplarily shows that the second plate of the first storage capacitor C1 receives the first level signal Vgl. In other feasible embodiments of the present invention, the second plate of the first storage capacitor C1 may also receive the second level signal Vgh and can store the gate potential of the second driving control transistor M32. In the phase when the driving control signal Vct is at the enable level, when the signal of the first initial node N1 is at the enable level, the enable level of the driving control signal Vct is written to the gate of the second driving control transistor M32 and the first storage capacitor C1. After the signal at the first initial node N1 jumps from the enable level to the non-enable level, the first storage capacitor C1 can keep the gate potential of the second driving control transistor M32 at the enable level, so as to ensure that the second driving control transistor M32 always remains in the on state when the driving control signal Vct remains at the enable level. In the phase when the driving control signal Vct is at the non-enable level, when the signal of the first initial node N1 is at the enable level, the non-enable level of the driving control signal Vct is written to the gate of the second driving control transistor M32 and the first storage capacitor C1. After the signal of the first initial node N1 jumps from the non-enable level to the enable level, the first storage capacitor C1 can keep the gate potential of the second driving control transistor M32 at the non-enable level, so as to ensure that the second driving control transistor M32 always remains in the off state in the phase when the driving control signal Vct remains at the non-enable level.

In one or more embodiments, with reference to FIG. 12, the second driving control unit 132 includes a third driving control transistor M33 and a second storage capacitor C2; a gate of the third driving control transistor M33 is electrically connected to the first initial node N1, a first electrode of the third driving control transistor M33 receives the second level signal Vgh, and a second electrode of the third driving control transistor M33 is electrically connected to the first driving node N3; a first plate of the second storage capacitor C2 receives a fixed signal, and a second plate of the second storage capacitor C2 is electrically connected to the first driving node N3.

In one or more embodiments, when the first initial node N1 is at the enable level, the third driving control transistor M33 is turned on so that the second level signal Vgh is transmitted to the first driving node N3. The enable level of the first initial node N1 simultaneously controls the driving output module 150 to output the first level signal Vgl to the driving output node N4 as the gate driving signal Gout and controls the active auxiliary module 140 to output the first level signal Vgl to the driving output node N4. The second level signal Vgh of the first driving node N3 controls the driving output module 150 to be unable to transmit the second level signal Vgh to the driving output node N4. Thus, the driving output node N4 remains as the first level signal Vgl. When the first initial node N1 is at the non-enable level, the third driving control transistor M33 is turned off so that the third driving control transistor M33 cannot transmit the second level signal Vgh to the first driving node N3. In this case, when the driving control signal Vct is at the non-enable level, the first driving node N3 and the second initial node N2 are isolated from each other, and the second storage capacitor C2 keeps the first driving node N3 at the second level signal Vgh. If the driving control signal Vct is at the enable level, the signal of the first driving node N3 is controlled by the second initial node N2 and is the same as the signal of the second initial node N2. The fixed signal electrically connected to the second storage capacitor C2 may be the first level signal Vgl or the second level signal Vgh. FIG. 12 exemplarily shows that the second plate of the second storage capacitor C2 receives the second level signal Vgh. In other feasible embodiments of the present invention, the second plate of the second storage capacitor C2 may also receive the first level signal Vgl and can store the signal of the first driving node N3.

Figure 13:
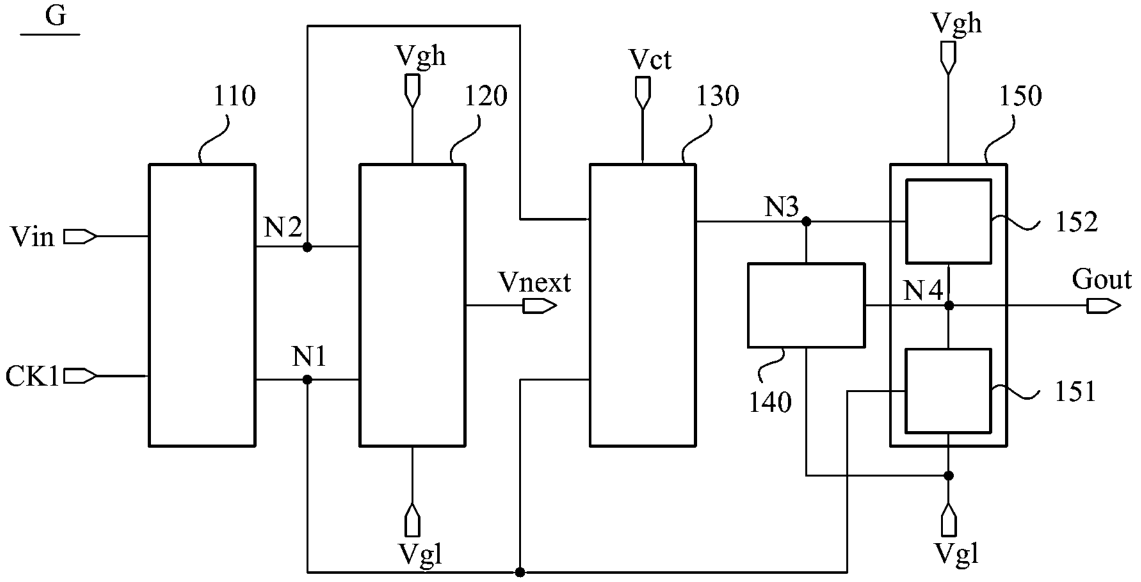
FIG. 13 is a diagram illustrating the structure of still another shift register unit according to an embodiment of the present invention.

In one or more embodiments, FIG. 13 is a diagram illustrating the structure of still another shift register unit according to an embodiment of the present invention. As shown in FIG. 13, the driving output module 150 includes a first driving output unit 151 and a second driving output unit 152; the first driving output unit 151 is configured to receive the signal of the first initial node N1 and the first level signal Vgl and control the gate driving signal Gout; the second driving output unit 152 is configured to receive the signal of the first driving node N3 and the second level signal Vgh and control the gate driving signal Gout.

In one or more embodiments, the first driving output unit 151 receives the signal of the first initial node N1 and the first level signal Vgl and can control the signal transmission path of the first level signal Vgl to the driving output node N4 under the control of the first initial node N1. The second driving output unit 152 receives the signal of the first driving node N3 and the second level signal Vgh and can control the signal transmission path of the second level signal Vgh to the driving output node N4 under the control of the first driving node N3. In this manner, the signal of the first initial node N1, the first level signal Vgl, the signal of the first driving node N3, and the second level signal Vgh can determine the polarity and amplitude of the gate driving signal Gout.

In an example embodiment, when the signal of the first initial node N1 is at an enable level, the first driving output unit 151 may transmit the first level signal Vgl to the driving output node N4 so that the gate driving signal Gout is the first level signal Vgl; when the signal of the first driving node N3 is at an enable level, the second driving output unit 152 can transmit the second level signal Vgh to the driving output node N4 so that the gate driving signal Gout is the second level signal Vgh.

Figure 14:
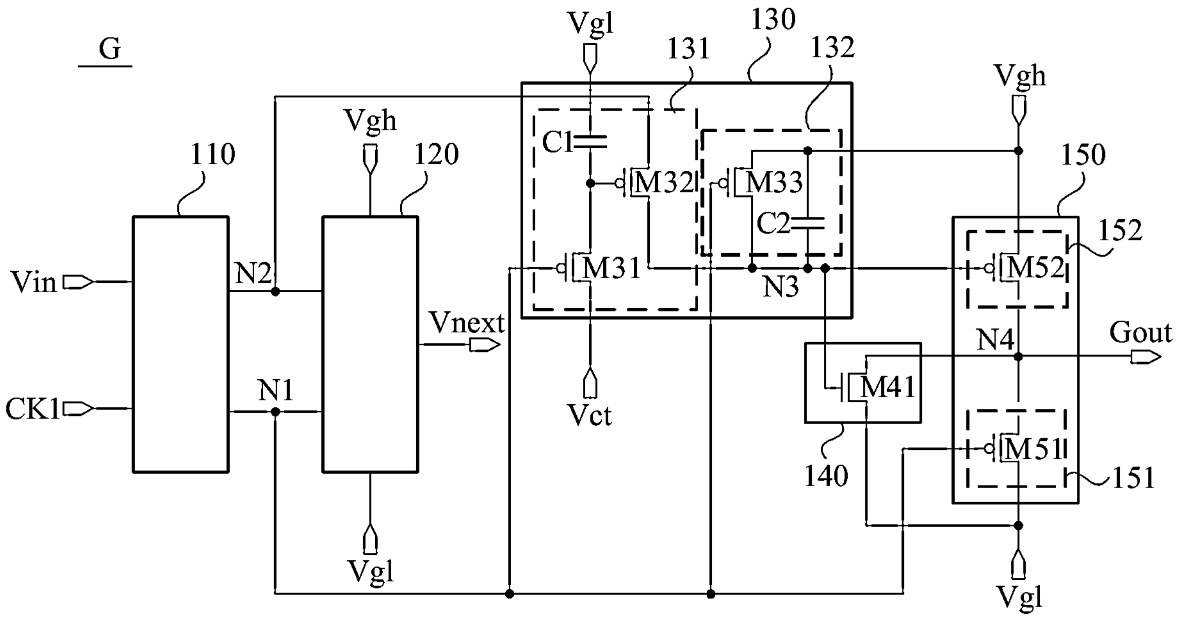
FIG. 14 is a diagram illustrating the structure of still another shift register unit according to an embodiment of the present invention.

In an optional embodiment, FIG. 14 is a diagram illustrating the structure of still another shift register unit according to an embodiment of the present invention. As shown in FIG. 14, the first driving output unit 151 includes a first driving output transistor M51; a gate of the first driving output transistor M51 is electrically connected to the first initial node N1, a first electrode of the first driving output transistor M51 receives the first level signal Vgl, and a second electrode of the first driving output transistor M51 is electrically connected to the driving output node N4. In this manner, the first driving output transistor M51 can be turned on or off under the control of the signal of the first initial node N1, and when the signal of the first initial node N1 controls the first driving output transistor M51 to be turned on, the first level signal Vgl received by the first electrode of the first driving output transistor M51 can be transmitted to the driving output node N4. Thus, the first level signal Vgl is used as the gate driving signal Gout output by the driving output node N4.

In one or more embodiments, with reference to FIG. 14, the second driving output unit 152 includes a second driving output transistor M52; a gate of the second driving output transistor M52 is electrically connected to the first driving node N3, a first electrode of the second driving output transistor M52 receives the second level signal Vgh, and a second electrode of the second driving output transistor M52 is electrically connected to the driving output node N4. In this manner, the second driving output transistor M52 can be turned on or off under the control of the signal of the first driving node N3, and when the signal of the first driving node N3 controls the second driving output transistor M52 to be turned on, the second level signal Vgh received by the first electrode of the second driving output transistor M52 can be transmitted to the driving output node N4. Thus, the second level signal Vgh is used as the gate driving signal Gout output by the driving output node N4.

Figure 15:
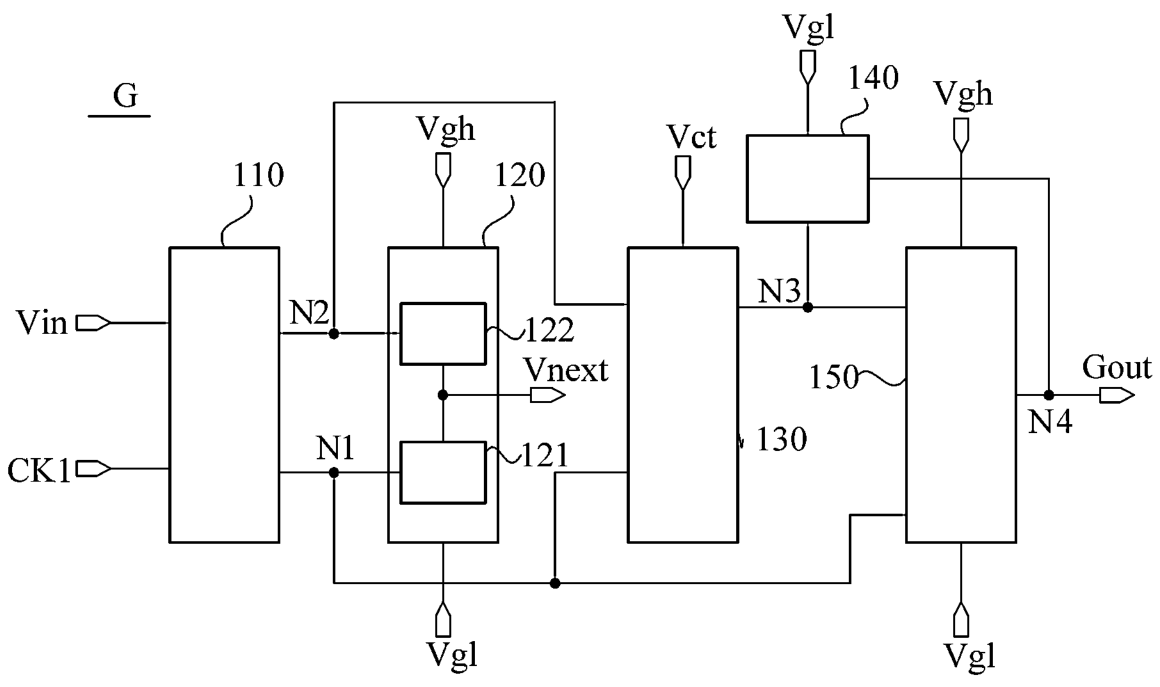
FIG. 15 is a diagram illustrating the structure of still another shift register unit according to an embodiment of the present invention.

In one or more embodiments, FIG. 15 is a diagram illustrating the structure of still another shift register unit according to an embodiment of the present invention. As shown in FIG. 15, the stage transmission output module 120 includes a first stage transmission output unit 121 and a second stage transmission output unit 122; the first stage transmission output unit 121 is configured to receive the signal of the first initial node N1 and the first level signal Vgl and control the stage transmission signal Vnext; the second stage transmission output unit 122 is configured to receive the signal of the second initial node N2 and the second level signal Vgh and control the stage transmission signal Vnext.

In one or more embodiments, the first stage transmission output unit 121 receives the signal of the first initial node N1 and the first level signal Vgl so that the first stage transmission output unit 121 can output the stage transmission signal Vnext under the control of the signal of the first initial node N1 and the first level signal Vgl. The second stage transmission output unit 122 receives the signal of the second initial node N2 and the second level signal Vgh so that the second stage transmission output unit 122 can output the stage transmission signal Vnext under the control of the signal of the second initial node N2 and the second level signal Vgh. In this manner, the signal of the first initial node N1, the first level signal Vgl, the signal of the second initial node N2, and the second level signal Vgh can determine the polarity and amplitude of the stage transmission signal Vnext.

In an example embodiment, when the signal of the first initial node N1 is at an enable level, the first stage transmission output unit 121 can control the stage transmission signal Vnext to be consistent with the first stage transmission Vgl, and when the signal of the second initial node N2 is at an enable level, the second stage transmission output unit 122 can control the stage transmission signal Vnext to be consistent with the second level signal Vgh.

Figure 16:
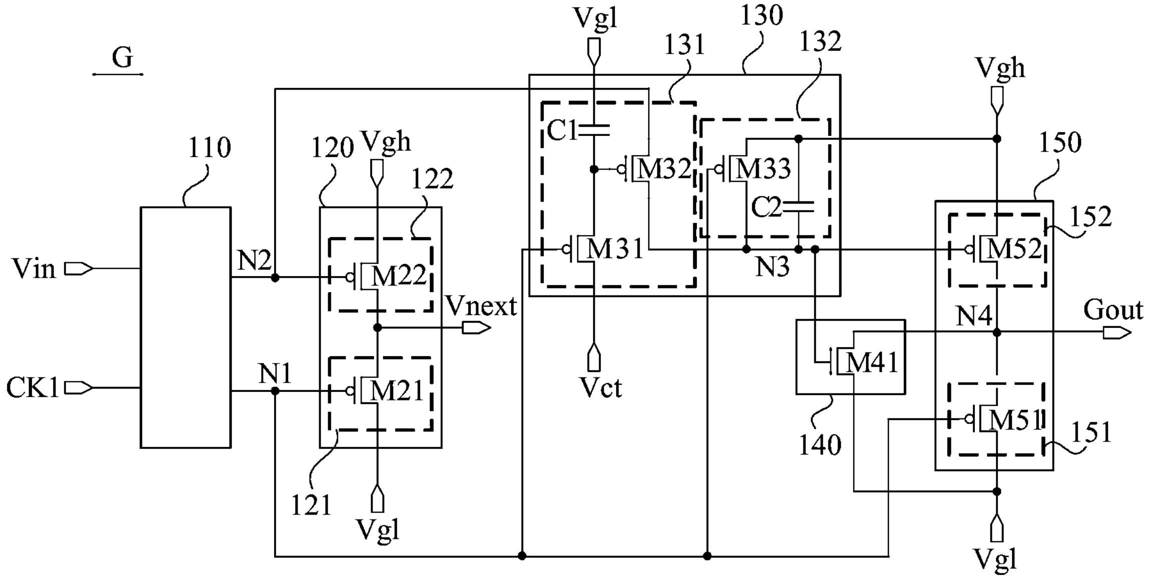
FIG. 16 is a diagram illustrating the structure of still another shift register unit according to an embodiment of the present invention.

In one or more embodiments, FIG. 16 is a diagram illustrating the structure of still another shift register unit according to an embodiment of the present invention. As shown in FIG. 16, the first stage transmission output unit 121 includes a first stage transmission output transistor M21; a gate of the first stage transmission output transistor M21 is electrically connected to the first initial node N1, a first electrode of the first stage transmission output transistor M21 receives the first level signal Vgl, and a second electrode of the first stage transmission output transistor M21 outputs the stage transmission signal Vnext. In this manner, the first stage transmission output transistor M21 can be turned on or off under the control of the signal of the first initial node N1, and when the signal of the first initial node N1 controls the first stage transmission output transistor M21 to be turned on, the first level signal Vgl received by the first electrode of the first stage transmission output transistor M21 can be transmitted to the second electrode. Thus, the first level signal Vgl is used as the stage transmission signal Vnext output by the second electrode of the first stage transmission output transistor M21.

In one or more embodiments, with reference to FIG. 16, the second stage transmission output unit 122 includes a second stage transmission output transistor M22; a gate of the second stage transmission output transistor M22 is electrically connected to the second initial node N2, a first electrode of the second stage transmission output transistor M22 receives the second level signal Vgh, and a second electrode of the second stage transmission output transistor M22 outputs the stage transmission signal Vnext. In this manner, the second stage transmission output transistor M22 can be turned on or off under the control of the signal of the second initial node N2, and when the signal of the second stage transmission node N2 controls the second stage transmission output transistor M22 to be turned on, the second level signal Vgh received by the first electrode of the second stage transmission output transistor M22 can be transmitted to the second electrode. Thus, the second level signal Vgh is used as the stage transmission signal Vnext output by the second electrode of the second stage transmission output transistor M22.

Figure 17:
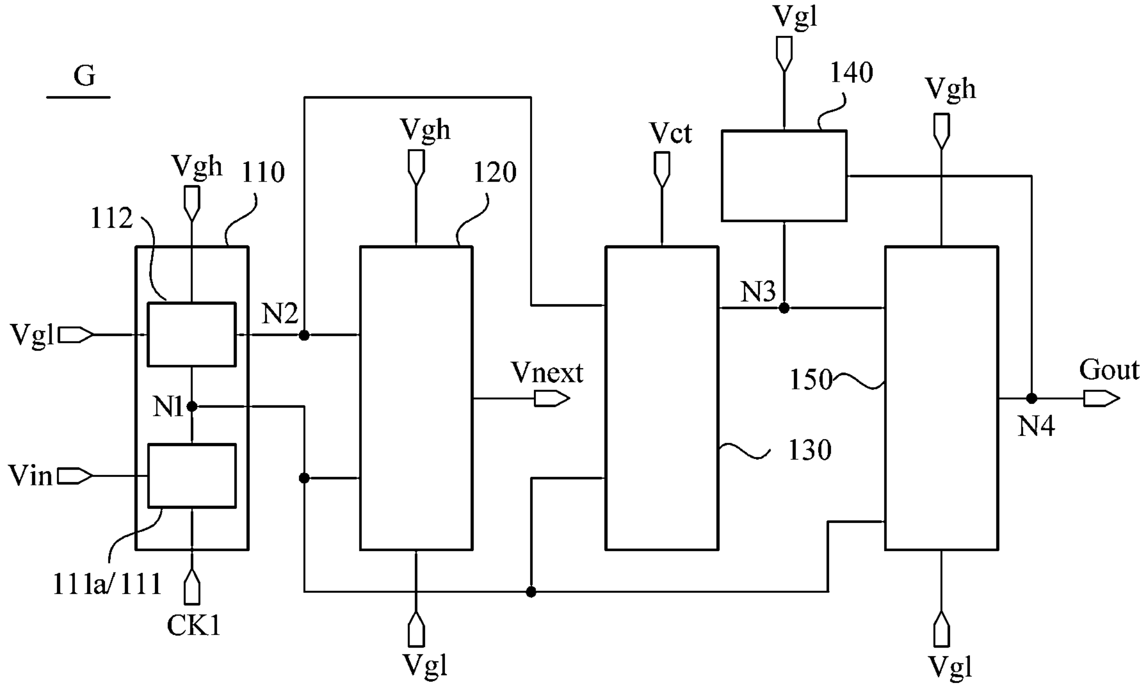
FIG. 17 is a diagram illustrating the structure of still another shift register unit according to an embodiment of the present invention.

In one or more embodiments, FIG. 17 is a diagram illustrating the structure of still another shift register unit according to an embodiment of the present invention. As shown in FIG. 17, the initial control module 110 includes a first initial control unit 111 and a second initial control unit 112; the first initial control unit 111 is configured to receive the input signal Vin and the first clock signal CK1 and control the signal of the first initial node N1; the second initial control unit 112 is configured to receive the signal of the first initial node N1, the first level signal Vgl, and the second level signal Vgh and control the signal of the second initial node N2.

In one or more embodiments, the first initial control unit 111 may provide a signal to the first initial node N1 under the control of the first clock signal CK1 and the input signal Vin so that the first clock signal CK1 and the input signal Vin can control the polarity and amplitude of the first initial node N1; the second initial control unit 112 can provide a signal to the second initial node N2 under the control of the signal of the first initial node N1, the first level signal Vgl, and the second level signal Vgh so that the signal of the first initial node N1, the first level signal Vgl, and the second level signal Vgh can control the polarity and amplitude of the second initial node N2.

In an example embodiment, when the first clock signal CK1 is at an enable level, the first initial control unit 111 may transmit the input signal Vin to the first initial node N1 so that the signal of the first initial node N1 is consistent with the input signal Vin. For the second initial control unit 112, when the signal of the first initial node N1 is at an enable level, the second initial control unit 112 may transmit the second level signal Vgh to the second initial node N2 so that the signal of the second initial node N2 is consistent with the second level signal Vgh; when the signal of the first initial node N1 is at a non-enable level, the second initial control unit 112 may transmit the first level signal Vgl to the second initial node N2 so that the signal of the second initial node N2 is consistent with the first level signal Vgl.

Figure 18:
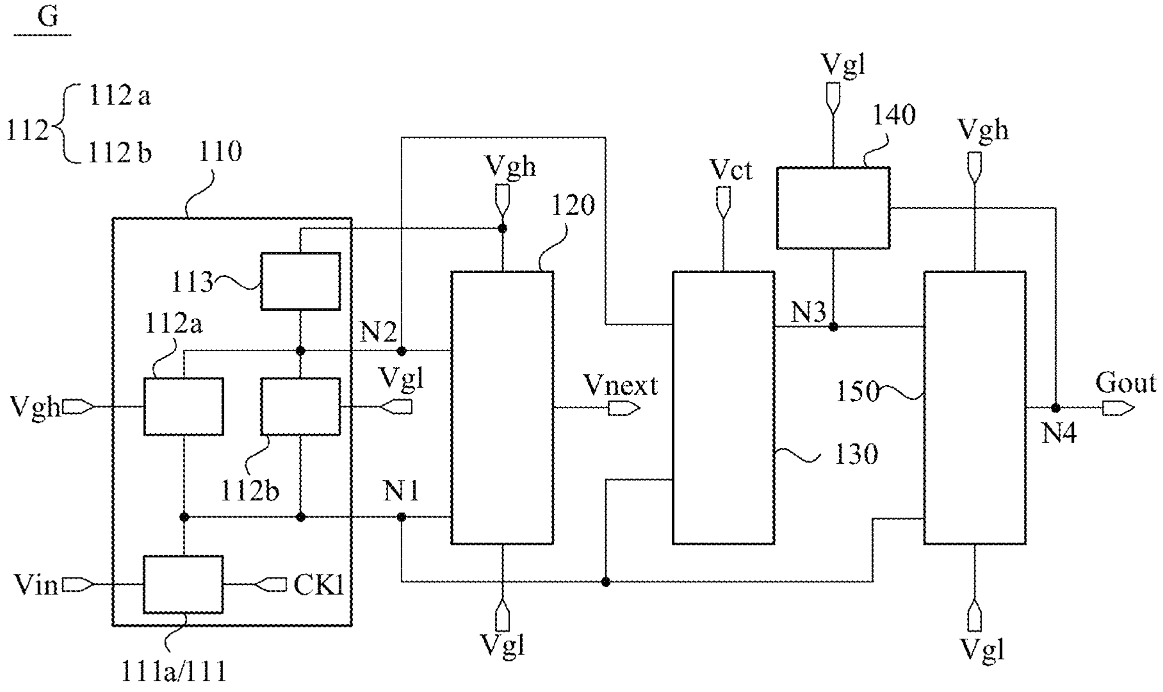
FIG. 18 is a diagram illustrating the structure of still another shift register unit according to an embodiment of the present invention.

In one or more embodiments, FIG. 18 is a diagram illustrating the structure of still another shift register unit according to an embodiment of the present invention. As shown in FIG. 18, the first initial control unit 111 includes an input subunit 111*a*; the input subunit 111*a* is configured to receive the input signal Vin and the first clock signal CK1 and control the signal of the first initial node N1. Thus, the first initial control unit 111 can provide a signal to the first initial node N1 under the control of the first clock signal CK1 and the input signal Vin, and the first clock signal CK1 and the input signal Vin can control the polarity and amplitude of the first initial node N1.

Figure 19:
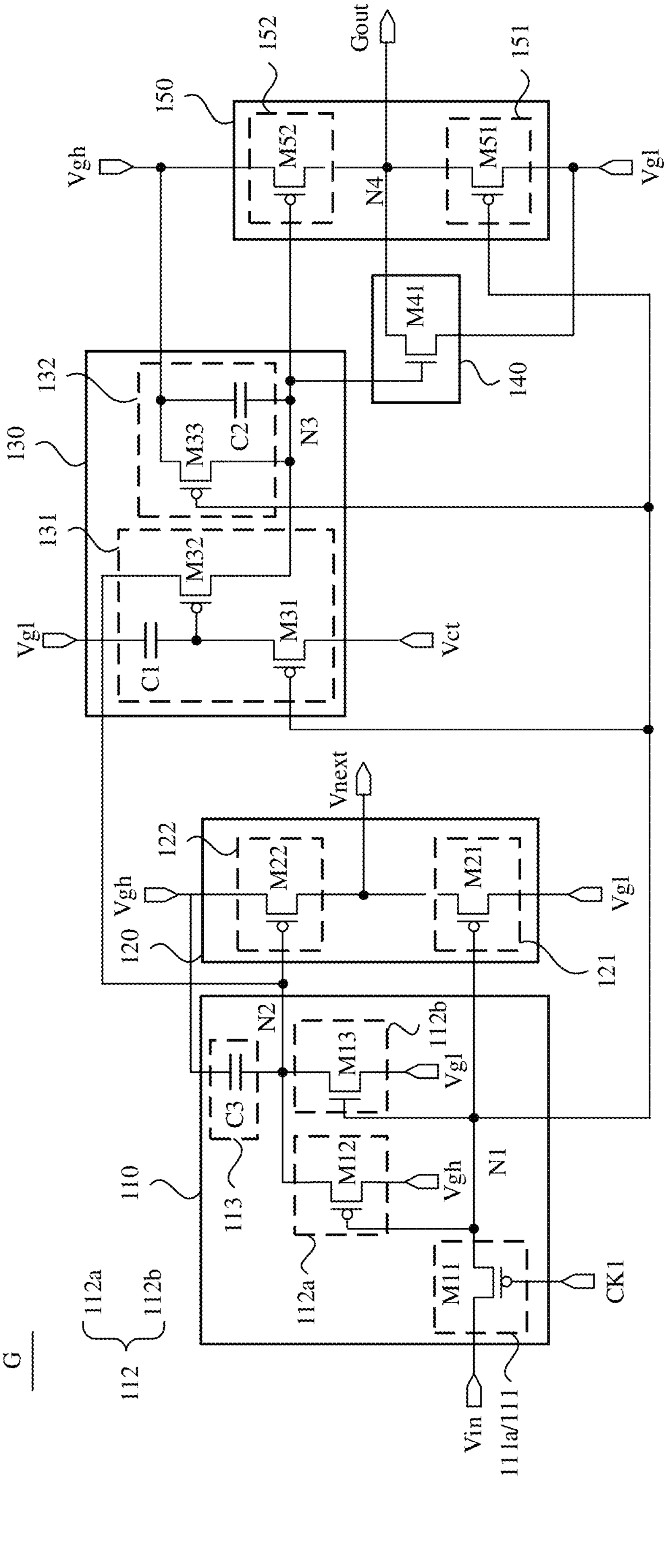
FIG. 19 is a diagram illustrating the structure of still another shift register unit according to an embodiment of the present invention.

In one or more embodiments, FIG. 19 is a diagram illustrating the structure of still another shift register unit according to an embodiment of the present invention. As shown in FIG. 19, the input subunit 111*a* includes a first input transistor M11; a gate of the first input transistor M11 receives the first clock signal CK1, a first electrode of the first input transistor M11 receives the input signal Vin, and a second electrode of the first input transistor M11 is electrically connected to the first initial node N1. In this manner, the first input transistor M11 can be turned on or off under the control of the first clock signal CK1, and when the first clock signal CK1 controls the first input transistor M11 to turn on, the input signal Vin received by the first electrode of the first input transistor M11 can be transmitted to the first initial node N1 so that the signal of the first initial node N1 is consistent with the input signal Vin. The first input transistor M11 may be an N-type MOS transistor or a P-type MOS transistor. In the absence of special instructions, the embodiments of the present invention all take the first input transistor M11 as a P-type MOS transistor to explain the technical solutions.

In one or more embodiments, with reference to FIG. 18, the second initial control unit 112 includes a first initial control subunit 112*a* and a second initial control subunit 112*b*; the first initial control subunit 112*a* is configured to receive the second level signal Vgh and the signal of the first initial node N1 and control the signal of the second initial node N2; the second initial control subunit 112*b* is configured to receive the first level signal Vgl and the signal of the first initial node N1 and control the signal of the second initial node N2. Thus, the first initial control subunit 112*a* may provide a signal to the second initial node N2 under the control of the first initial node N1 and the second level signal Vgh, and the second initial control subunit 112*b* may provide a signal to the second initial node N2 under the control of the first initial node N1 and the first level signal Vgl.

In one or more embodiments, the first initial control subunit 112*a* and the second initial control subunit 112*b* have different enable levels so that at the same time, the first initial node N1 controls one of 112*a* and 112*b* to be in an on state and the other to be in an off state.

In one or more embodiments, with reference to FIG. 19, the first initial control subunit 112*a* includes a first initial control transistor M12; a gate of the first initial control transistor M12 is electrically connected to the first initial node N1, a first electrode of the first initial control transistor M12 receives the second level signal Vgh, and a second electrode of the first initial control transistor M12 is electrically connected to the second initial node N2. In this manner, the first initial control transistor M12 can be turned on or off under the control of the signal of the first initial node N1, and when the signal of the first initial node N1 controls the first initial control transistor M12 to be turned on, the second level signal Vgh received by the first electrode of the first initial control transistor M12 can be transmitted to the second initial node N2. Thus, the signal of the second initial node N2 is consistent with the second level signal Vgh.

In one or more embodiments, with reference to FIG. 19, the second initial control subunit 112*b* includes a second initial control transistor M13; a gate of the second initial control transistor M13 is electrically connected to the first initial node N1, a first electrode of the second initial control transistor M13 receives the first level signal Vgl, and a second electrode of the first initial control transistor M13 is electrically connected to the second initial node N2. In this manner, the second initial control transistor M13 can be turned on or off under the control of the signal of the first initial node N1, and when the signal of the first initial node N1 controls the second initial control transistor M13 to be turned on, the first level signal Vgl received by the first electrode of the second initial control transistor M13 can be transmitted to the second initial node N2. Thus, the signal of the second initial node N2 is consistent with the first level signal Vgl.

In one or more embodiments, the first initial control transistor M12 may be set as a P-type MOS transistor, and the second initial control transistor M13 may be set as an N-type MOS transistor. In this case, when the first initial node N1 is at a low level, the first initial control transistor M12 is turned on, the second initial control transistor M13 is turned off, and the second initial node N2 is written with the second level signal Vgh; when the first initial node N1 is at a high level, the first initial control transistor M12 is turned off, the second initial control transistor M13 is turned on, and the second initial node N2 is written with the first level signal Vgl. Alternatively, in another feasible embodiment, the first initial control transistor M12 may be set as an N-type MOS transistor, and the second initial control transistor M13 may be set as a P-type MOS transistor. In this case, when the first initial node N1 is at a low level, the first initial control transistor M12 is turned off, the second initial control transistor M13 is turned on, and the second initial node N2 is written with the first level signal Vgl; when the first initial node N1 is at a high level, the first initial control transistor M12 is turned on, the second initial control transistor M13 is turned off, and the second initial node N2 is written with the second level signal Vgh. Unless otherwise specified, the embodiments of the present invention use an example where the first initial control transistor M12 is a P-type MOS transistor and the second initial control transistor M13 is an N-type MOS transistor to explain the technical solutions.

In one or more embodiments, when it is necessary to control the first shift register unit G01 in the driver circuit 10 not to output the valid pulse of the gate driving signal Gout01 and only output the valid pulse of the stage transmission signal Vnext01, the driving control signal Vct may be controlled to jump from the enable level to the non-enable level before the first shift register unit G01 outputs the valid pulse of the stage transmission signal Vnext01. Assuming that the moment when the input signal Vin outputs the valid pulse is a third moment t3, the first clock signal CK1 may jump from the enable level to the non-enable level at a second moment t2 before the third moment. The phase before the input signal Vin outputs the valid pulse is the hold phase of the previous display frame, at which the first initial node N1 is maintained at the enable level so that the first driving control transistor M31 remains in the on state. The first moment t1 when the control driving control signal Vct jumps from the enable level to the non-enable level is before the second moment t2. The first clock signal CK1 may be kept at the enable level before the second moment t2 so that the enable level of the driving control signal Vct is written to the gate of the second driving control transistor M32. In this manner, the second driving control transistor M32 is turned on so that the current non-enable level of the second initial node N2 is written to the first driving node N3. Thus, the non-enable level can be written to the first driving node N3 before the input signal Vin outputs a valid pulse, the second driving output transistor M52 can be turned off before the input signal Vin outputs a valid pulse, and the second level signal Vgh is not transmitted to the driving output node. In this manner, the accuracy of the first driving node N3 can be guaranteed, thereby ensuring the accuracy of the output gate driving signal Gout01.

In one or more embodiments, with continued reference to FIG. 18, the initial control module 110 also includes a storage unit 113; a first terminal of the storage unit 113 receives a fixed signal, and a second terminal of the storage unit 113 is electrically connected to the second initial node N2. The storage unit 113 is configured to store the signal of the second initial node N2 so that the signal of the second initial node N2 can remain stable.

In one or more embodiments, with continued reference to FIG. 19, the storage unit 113 includes a third storage capacitor C3; a first plate of the third storage capacitor C3 receives a fixed signal, and a second plate of the third storage capacitor C3 is electrically connected to the second initial node N2. The fixed signal electrically connected to the third storage capacitor C3 may be the first level signal Vgl or the second level signal Vgh. FIG. 12 exemplarily shows that the fixed signal received by the second plate of the second storage capacitor C2 is the second level signal Vgh. In other feasible embodiments of the present invention, the second plate of the third storage capacitor C3 may also receive the first level signal Vgl and may store the signal of the second initial node N2 so that the signal of the second initial node N2 remains stable.

Figure 20:
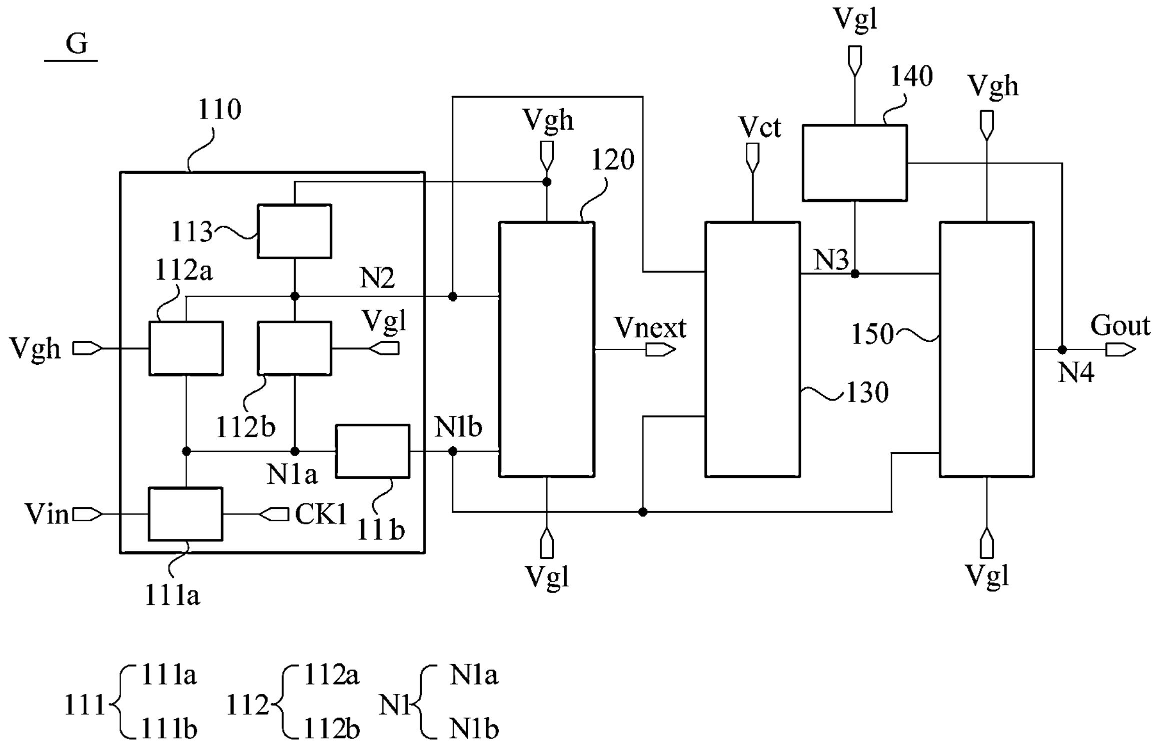
FIG. 20 is a diagram illustrating the structure of still another shift register unit according to an embodiment of the present invention.

In one or more embodiments, FIG. 20 is a diagram illustrating the structure of still another shift register unit according to an embodiment of the present invention. As shown in FIG. 20, the first initial control unit 111 also includes a charge pump subunit 111*b*; the first initial node N1 includes a first initial subnode N1*a* and a second initial subnode N1*b*; the input subunit 111*a* is also configured to receive the input signal Vin and the first clock signal CK1 and control a signal of the first initial subnode N1*a*; the charge pump subunit 111*b* is configured to receive at least the signal of the first initial subnode N1*a* and a second clock signal CK2 and control a signal of the second initial subnode N1*b*; the stage transmission output module 120 is also configured to control the stage transmission signal Vnext based on the signal of the second initial node N2 and the signal of the second initial subnode N1*b*.

In one or more embodiments, the input subunit 111*a* controls the transmission path of the input signal Vin to the first initial subnode N1*a* under the control of the first clock signal CK1. The charge pump subunit 111*b* may control the coupling amount to the second initial subnode N1*b* based on the signal of the first initial subnode N1*a* and the second clock signal CK2, which can improve the charging speed of the stage transmission output module 120. For example, when the first initial subnode N1*a* jumps from the non-enable level to the enable level, the stage transmission output module 120 may control the stage transmission signal Vnext to quickly jump to the enable level.

Figure 21:
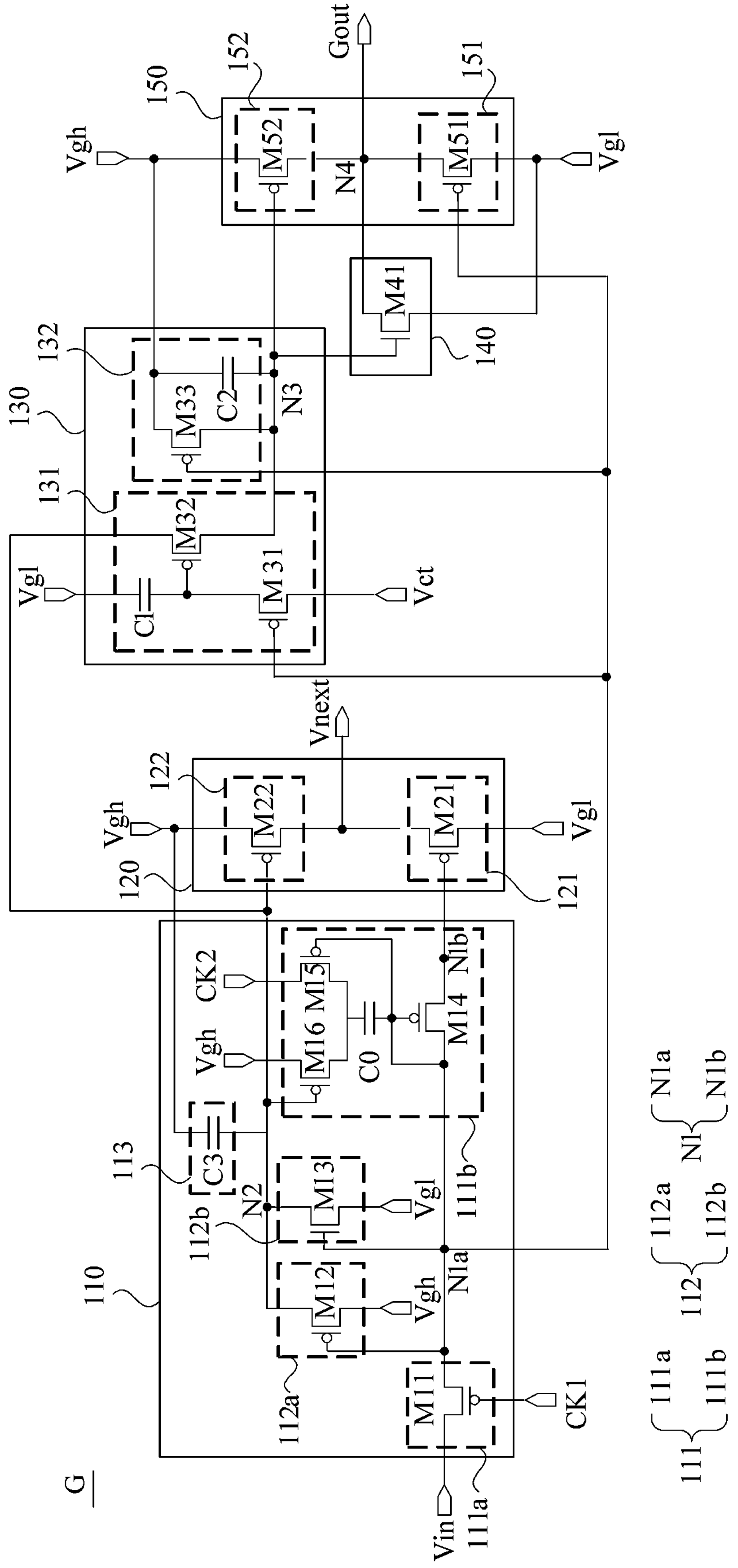
FIG. 21 is a driving timing diagram of still another shift register unit according to an embodiment of the present invention.

In one or more embodiments, FIG. 21 is a diagram illustrating the structure of still another shift register unit according to an embodiment of the present invention. As shown in FIG. 21, the charge pump subunit 111*b* includes a first auxiliary transistor M14, a second auxiliary transistor M15, and a first bootstrap capacitor C0; a gate and a first electrode of the first auxiliary transistor M14 are both electrically connected to the first initial subnode N1*a*, and a second electrode of the first auxiliary transistor M14 is electrically connected to the second initial subnode N1*b*; a gate of the second auxiliary transistor M15 is electrically connected to the first initial subnode N1*a*, a first electrode of the second auxiliary transistor M15 receives the second clock signal CK2, a second electrode of the second auxiliary transistor M15 is electrically connected to a first plate of the first bootstrap capacitor C0, and a second plate of the first bootstrap capacitor C0 is electrically connected to the first initial subnode N1*a*.

In one or more embodiments, an example is used where both the first auxiliary transistor M14 and the second auxiliary transistor M15 are P-type MOS transistors. When the input signal Vin is at a low level, if the first clock signal CK1 is at a low level, the first input transistor M11 is turned on. In this manner, the first initial subnode N1*a* is at a low level, thereby making the first auxiliary transistor M14 and the second auxiliary transistor M15 both turned on, the second initial subnode N1*b* is also at a low level, and the polarity of the first clock signal CK1 is opposite to that of the second clock signal CK2. Then, the second clock signal CK2 is at a high level. In this case, if the first clock signal CK1 jumps from a low level to a high level, the second clock signal CK2 jumps from a high level to a low level, the first input transistor M11 is turned off, and the first initial subnode N1*a* remains at a low level so that the first auxiliary transistor M14 and the second auxiliary transistor M15 are continuously turned on. Under the coupling effect of the first bootstrap capacitor C0, the low level of the second clock signal CK2 causes the potential of the second initial subnode N1*b* to be further pulled down so that the first stage transmission output transistor M21 in the stage transmission output module 120 is fully turned on, and the stage transmission signal Vnext output by the stage transmission output module 120 quickly jumps to the first level signal Vgl.

Figure 22:
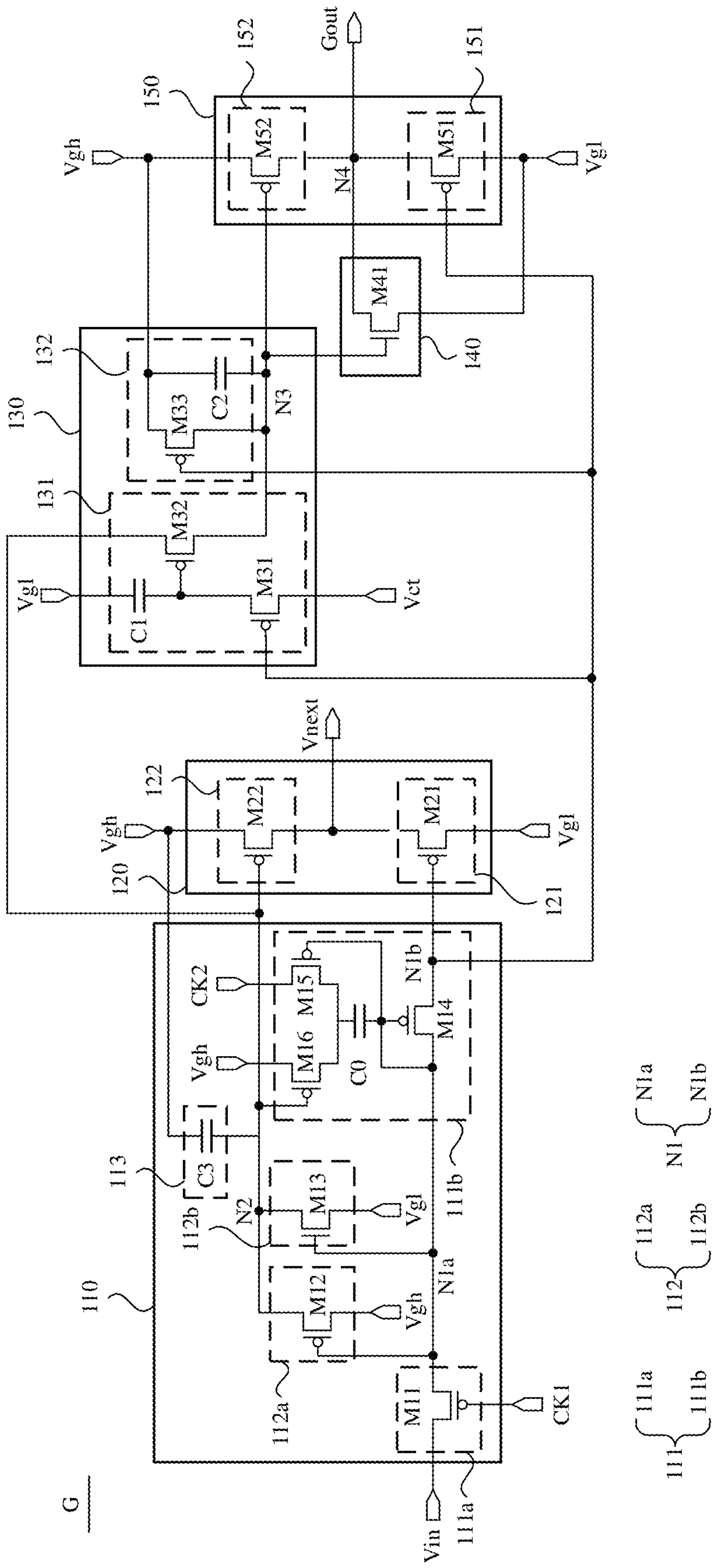
FIG. 22 is a diagram illustrating the structure of still another shift register unit according to an embodiment of the present invention.

In one or more embodiments, FIG. 22 is a diagram illustrating the structure of still another shift register unit according to an embodiment of the present invention. As shown in FIG. 22, the driving control module 130 and the driving output module 140 may be electrically connected to the second initial subnode N1*b*. That is, the gate of the first driving control transistor M31 is electrically connected to the second initial subnode N1*b*, the gate of the third driving control transistor M33 is electrically connected to the second initial subnode N1*b*, and the gate of the first driving output transistor M51 is electrically connected to the second initial subnode N1*b*. In this manner, when the first initial subnode N1*a* is kept at a low level and the second clock signal CK2 is at a low level, the first driving control transistor M31, the third driving control transistor M33, and the first driving output transistor M51 can be fully turned on. Thus, the gate potential of the second driving control transistor M32 can jump quickly when the first driving control transistor M31 is fully turned on, and the signal of the first driving node N3 can jump quickly when the third driving control transistor M33 is fully turned on, and the gate driving signal Gout can jump quickly when the first driving output transistor M51 is fully turned on.

In one or more embodiments, with reference to FIG. 21 or FIG. 22, the charge pump subunit 111*b* also includes a third auxiliary transistor M16; a gate of the third auxiliary transistor M16 is electrically connected to the second initial node N2, a first electrode of the third auxiliary transistor M16 receives the second level signal Vgh, and a second electrode of the third auxiliary transistor M16 is electrically connected to the first plate of the first bootstrap capacitor C0.

In one or more embodiments, an example is used where the first auxiliary transistor M14, the second auxiliary transistor M15, and the third auxiliary transistor M16 are P-type MOS transistors. When the input signal Vin is at a high level, if the first clock signal CK1 is at a low level, the first input transistor M11 is turned on so that the first initial subnode N1*a* is at a high level. Then the first auxiliary transistor M14 and the second auxiliary transistor M15 are turned off, the second initial control transistor M13 is turned on, and the second initial node N2 is written with the first level signal Vgl. Thus, the third auxiliary transistor M16 is turned on so that the second level signal Vgh is written to the first bootstrap capacitor C0 through the third auxiliary transistor M16. In this case, under the coupling effect of the first bootstrap capacitor C0, the potential of the first initial subnode N1*a* is pulled up so that the first auxiliary transistor M14 is completely turned off, thereby reducing the leakage current of the second initial subnode N1*b*, and the signal of the second initial subnode N1*b* can be kept stable.

Figure 23:
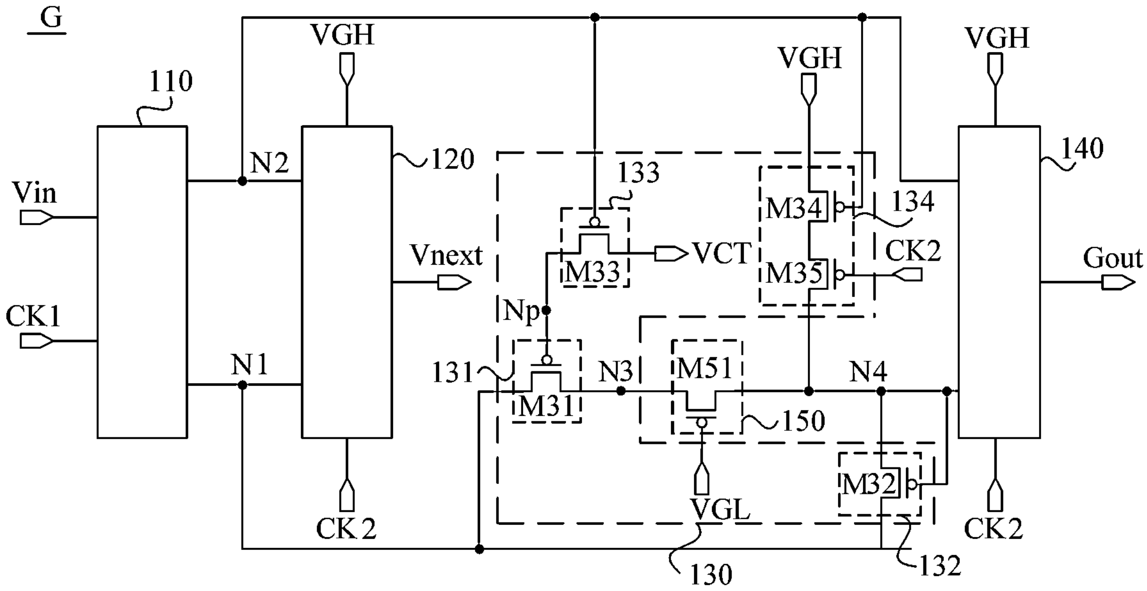
FIG. 23 is a diagram illustrating the structure of still another shift register unit according to an embodiment of the present invention.

In one or more embodiments, FIG. 23 is a diagram illustrating the structure of still another shift register unit according to an embodiment of the present invention. As shown in FIG. 23, the first initial control unit 111 also includes a voltage regulator subunit 111*c*, and the input subunit 111*a* is electrically connected to the first initial node N1 through the voltage regulator subunit 111*c*.

Figure 24:
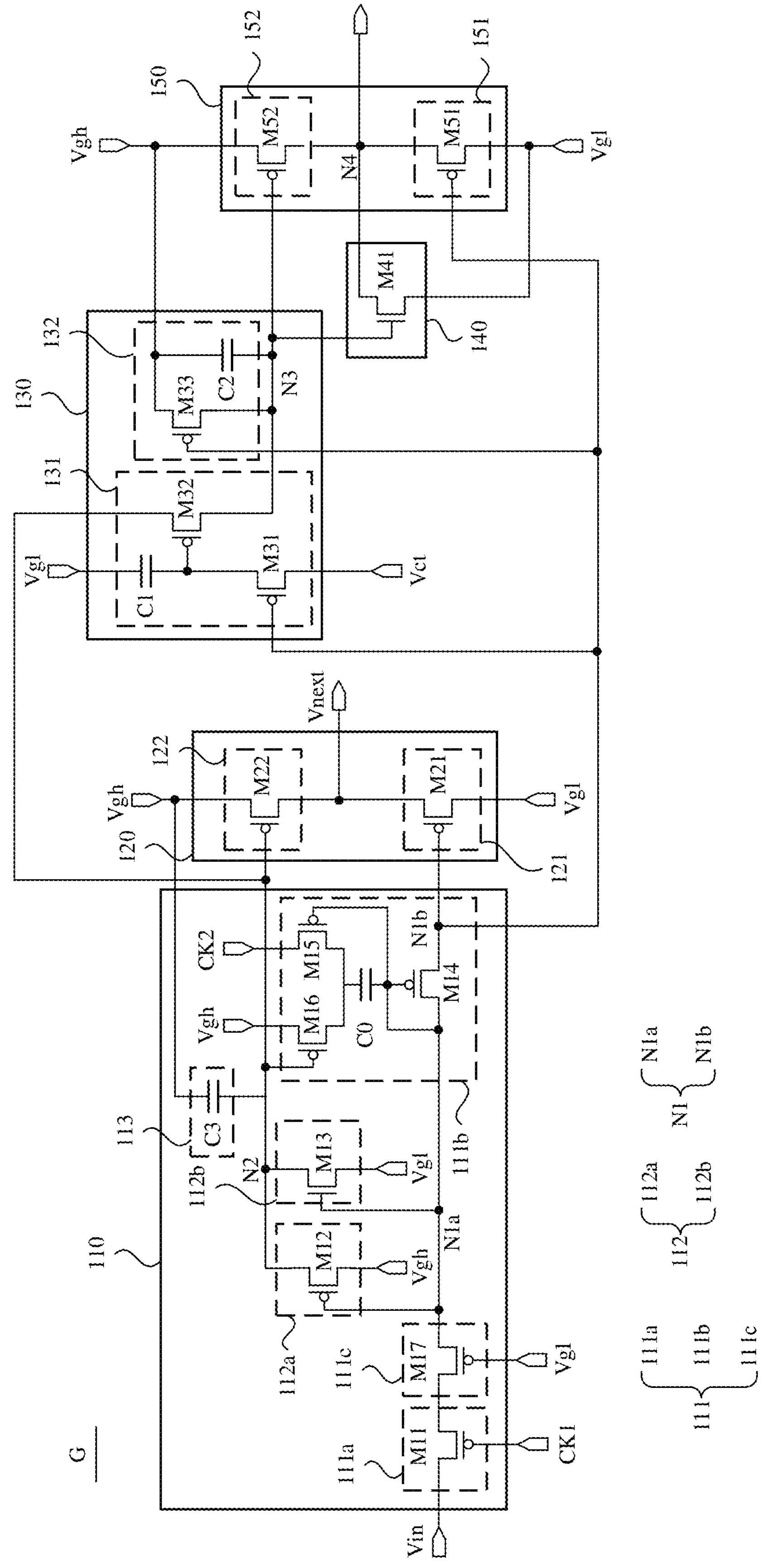
FIG. 24 is a diagram illustrating the structure of still another shift register unit according to an embodiment of the present invention.

In one or more embodiments, FIG. 24 is a diagram illustrating the structure of still another shift register unit according to an embodiment of the present invention. As shown in FIG. 24, the voltage regulator subunit 111*c* includes a first voltage regulation transistor M17 that may be a P-type MOS transistor. In this case, a gate of the first voltage regulation transistor M17 receives the first level signal Vgl, a first electrode of M17 is electrically connected to the second electrode of the first input transistor M11 in the output subunit 111*a*, and a second electrode of M17 is electrically connected to the first initial node N1. In this manner, the first voltage regulation transistor M17 remains always on under the control of the first level signal Vgl, ensuring that the first electrode potential of the first voltage regulation transistor M17 is basically consistent with the second electrode potential. However, since the turned-on first voltage regulation transistor M17 has a certain resistance, when the signal of the first initial node N1 changes, the first voltage regulation transistor M17 can reduce the change amount of the signal of the first initial node N1 varying with the first electrode signal of the first voltage regulation transistor M17. Thus, by placing the first voltage regulation transistor M17 between the second electrode of the first input transistor M11 and the first initial node N1, the stability of the signal of the first initial node N1 is ensured, thus improving the stability of the stage transmission signal Vnext output by the first stage transmission output transistor M21.

Figure 25:
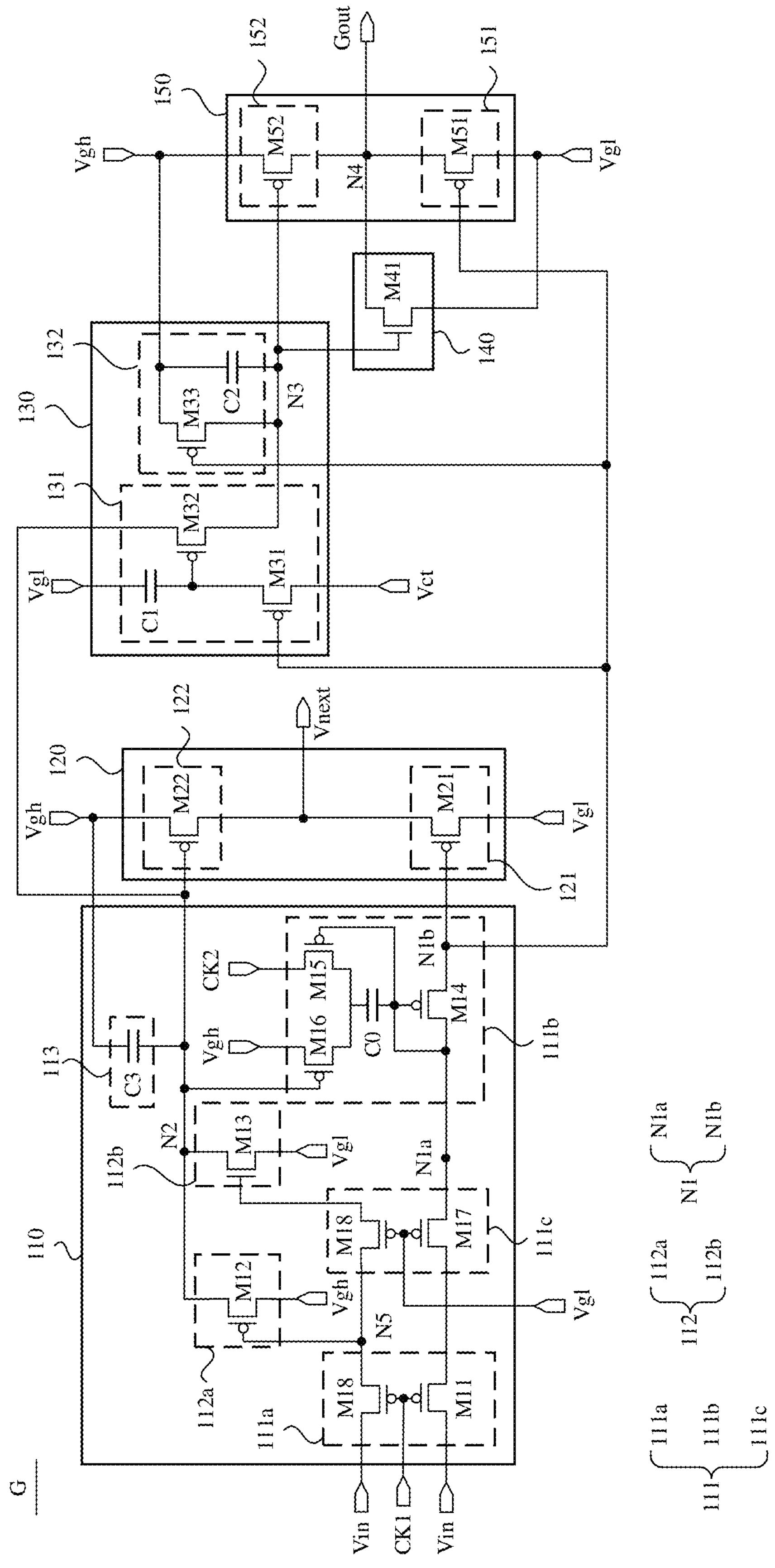
FIG. 25 is a diagram illustrating the structure of still another shift register unit according to an embodiment of the present invention.

In one or more embodiments, FIG. 25 is a diagram illustrating the structure of still another shift register unit according to an embodiment of the present invention. As shown in FIG. 25, the input subunit also includes a second input transistor M18; a gate of the second input transistor M18 receives the first clock signal CK1, a first electrode of the second input transistor M18 receives the input signal Vin, and a second electrode of the second input transistor M18 is electrically connected to a third initial node N5. Thus, the second input transistor M18 can be turned on or off under the control of the first clock signal CK1. When turned on, M18 writes the input signal Vin to the third initial node N5. The channel types of the second input transistor M18 and the first input transistor M11 may be the same. For example, M18 and M11 may be P-type MOS transistors, ensuring that the potential of the third initial node N5 is the same as the potential of the first initial node N1. In this case, the gate of the first initial control transistor M12 in the first initial control subunit 112*a* may be electrically connected to the third initial node N5. In another feasible embodiment, the gate of the second initial control transistor M13 in the second initial control subunit 112*b* may also be electrically connected to the third initial node N5.

In one or more embodiments, with reference to FIG. 25, the voltage regulator subunit 25 may also include a second voltage regulation transistor M19. The second voltage regulation transistor M19 may be a P-type MOS transistor. A gate of M19 receives the first level signal Vgl, a first electrode of M19 is electrically connected to the third initial node N5, and a second electrode of M19 is electrically connected to the gate of the second initial control transistor M13 in the second initial control subunit 112*b*. This arrangement ensures that the gate potential of the second initial control transistor M13 remains stable. In another feasible embodiment, the second electrode of the second voltage regulation transistor M19 may also be electrically connected to the gate of the first initial control transistor M12 in the first initial control subunit 112*a*, which ensures that the gate potential of the first initial control transistor M12 remains stable.

The above embodiments provide an exemplary description of the driver circuit and the internal shift register unit thereof, but the driver circuit and the internal shift register unit thereof are not limited to the above embodiments. Next, an exemplary description is provided regarding the pixel circuit and the connection between the shift register unit and the pixel circuit.

Figure 26:
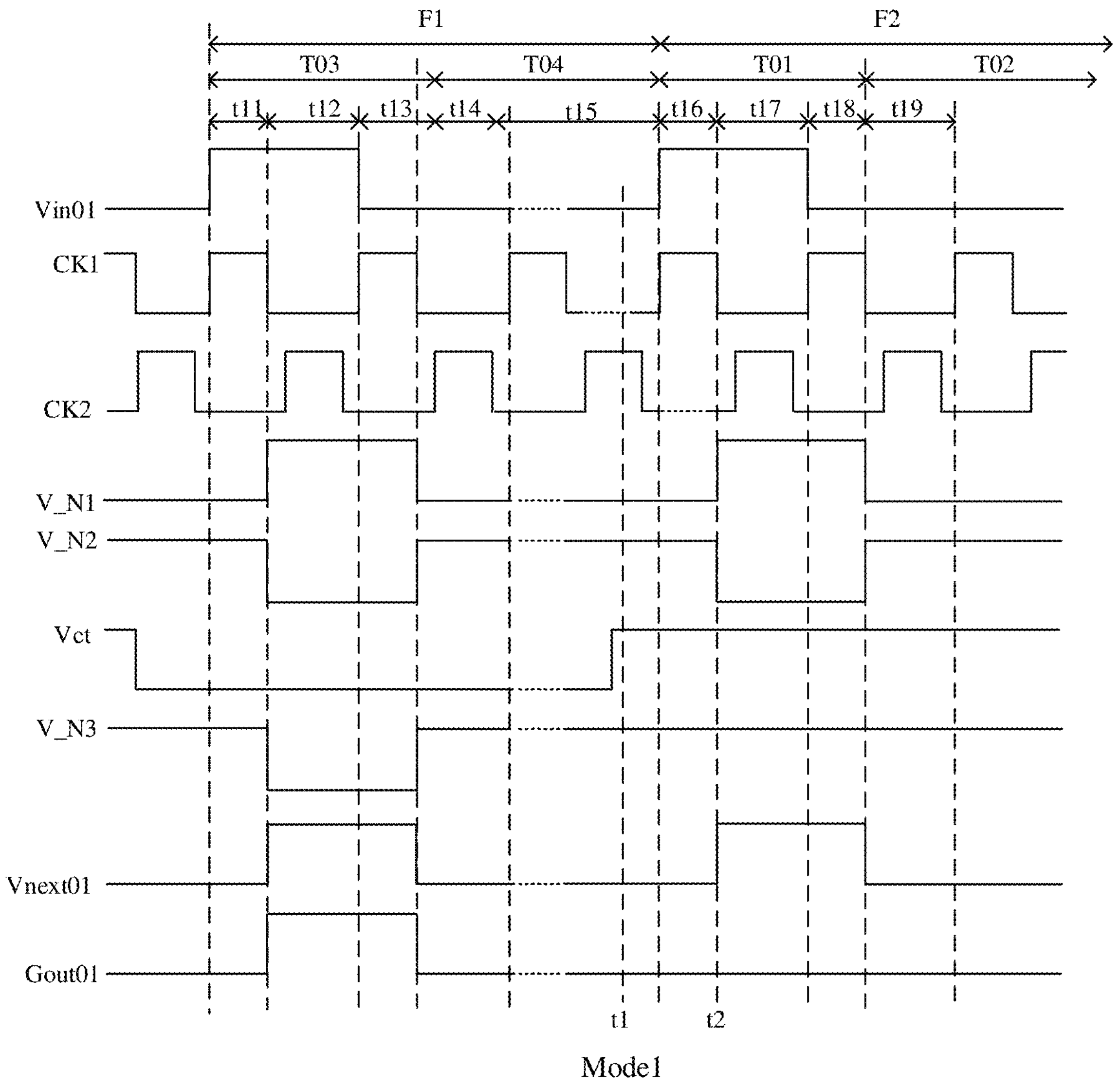
FIG. 26 is a driving timing diagram of still another shift register unit according to an embodiment of the present invention.

In an example embodiment, the working principle of the shift register unit G is explained, with an example where the active auxiliary transistor M41 and the second initial control transistor M13 in the shift register unit G are N-type MOS transistors while the other transistors are P-type MOS transistors. FIG. 26 is a driving timing diagram of still another shift register unit according to an embodiment of the present invention. With reference to FIGS. 24 and 26, before the t11 phase, since the input signal Vin is at a low level, when the first clock signal CK1 controls the first input transistor M11 to turn on, the first input transistor M11 transmits the low-level input signal Vin to the first initial subnode N1*a*, causing the signal of the first initial subnode N1*a* to be at a low level; the signal of the first initial subnode N1*a* controls the first initial control transistor M12 to turn on and writes the second level signal Vgh to the second initial node N2, causing the signal V_N2 of the second initial node N2 to be at a high level; the signal of the first initial subnode N1*a* also controls the first auxiliary transistor M14 to turn on, causing the second initial subnode N1*b* to be at the same low level as the first initial subnode N1*a*, that is, the signal V_N1 of the first initial node N1 is a low level. Then the signal V_N1 of the first initial node N1 controls the first stage transmission output transistor M21, the first driving control transistor M31, the third driving control transistor M33, and the first driving output transistor M51 to remain conductive, and the signal of the second initial node N2 controls the second stage transmission output transistor M22 to turn off. As a result, the first stage transmission output transistor M21 outputs the first level signal Vgl as the stage transmission signal Vnext, and the first driving output transistor M51 outputs the first level signal Vgl as the gate driving signal Gout. The enable level of the driving control signal Vct is written to the gate of the second driving control transistor M32 via the first driving control transistor M31 to control the second driving control transistor M32 to turn on. The high-level signal of the second initial node N2 is transmitted to the first driving node N3, while the low level of the first initial node N1 controls the third driving control transistor M33. Thus, the second level signal Vgh received by the first electrode of the third driving control transistor M33 can also be transmitted to the first driving node N3. As a result, the second driving output transistor M52 is turned off, and the active auxiliary transistor M41 is turned on, preventing the second driving output transistor M52 from transmitting the second level signal Vgh to the driving output node N4. Moreover, the first level signal Vgl of the first electrode of the active auxiliary transistor M41 is transmitted to the driving output node N4 so that the gate driving signal Gout remains as the low-level first level signal Vgl.

In the t11 phase, the driving control signal Vct remains at the low level, and the input signal Vin switches to a high level, while the first clock signal CK1 is at a high level, and the second clock signal CK2 is at a low level. In this case, the first clock signal CK1 controls the first input transistor M11 to turn off, the first initial node N1 remains at the low level of the previous phase, and the low level of the second clock signal CK2 is coupled to the first initial node N1 through the first bootstrap capacitor C0 so that the potential of the first initial node N1 is stabilized at a low level. As a result, the signal of the second initial node N2 is the same as that in the previous phase and remains at a high level, causing the stage transmission signal Vnext to remain at a low-level first level signal Vgl and the gate driving signal Gout to remain at a low-level first level signal Vgl.

In the t12 phase, the driving control signal Vct remains at a low level, and the input signal Vin remains at a high level, while the first clock signal CK1 is at a low level, and the second clock signal CK2 is at a high level. In this case, the first clock signal CK1 controls the first input transistor M11 to turn on, and the high-level input signal Vin is transmitted to the first initial node N1 through the first input transistor M11, causing the signal V_N1 of the first initial node N1 to be at a high level. The high-level signal can control the first stage transmission output transistor M21, the first driving control transistor M31, the third driving control transistor M33, and the first driving output transistor M51 to be turned off and the second initial control transistor M13 to be turned on. Then the first level Vgl is written to the second initial node through the second initial control transistor M13 so that the signal V_N2 of the second initial node N2 is at a low level. The low-level signal can simultaneously control the second stage transmission output transistor M22 to turn on, causing the high-level first level signal Vgh to be transmitted to the second electrode of the second stage transmission output transistor M22 and the initial output signal Vnext to remain at a high level. At the same time, the first driving control transistor M31 is turned off so that the gate of the second driving control transistor M32 remains as the signal of the previous phase, that is, the gate of the second driving control transistor M32 remains at a low level. In this manner, the low-level signal of the second initial node N2 is transmitted to the first driving node through the second driving control transistor M32. The low-level signal can control the second driving output transistor M52 to turn on and control the active auxiliary transistor M41 to turn off so that the gate driving signal Gout outputs the second level signal Vgh as the gate driving signal Gout, that is, the stage transmission signal Vnext and the gate driving signal Gout both output a high level. In addition, the low-level signal of the second initial node N2 controls the third auxiliary transistor M16 to turn on so that the second level signal Vgh is coupled to the first initial node N1 through the bootstrap capacitor C0, and the potential of the first initial node N1 is further raised. Thus, the first stage transmission output transistor M21, the first driving control transistor M31, the third driving control transistor M33, and the first driving output transistor M51 are completely disconnected.

In the t13 phase, the input signal Vin jumps to a low level, the first clock signal CK1 is at a high level, and the second clock signal CK2 is at a low level. In this case, the first clock signal CK1 controls the first input transistor M11 to be disconnected, and the signal of the first initial node N1 remains at the high level of the previous phase. Thus, the signal of the second initial node N2 is the same as that of the previous phase and remains at a low level, the stage transmission signal Vnext remains at a high-level second level signal Vgh, and the gate driving signal Gout remains at a high-level second level signal Vgh.

In the t14 phase, the input signal Vin and the driving control signal Vct remain at a low level, while the first clock signal CK1 is at a low level, and the second clock signal CK2 is at a high level. Then the first input transistor M11 is turned on, and the low-level input signal Vin is transmitted to the first initial node N1. The signal V_N1 of the first initial node N1 controls the first initial control transistor M12 to turn on and writes the second level signal Vgh to the second initial node N2 so that the signal V_N2 of the second initial node N2 is at a high level. Thus, the signal V_N1 of the first initial node N1 controls the first stage transmission output transistor M21, the first driving control transistor M31, the third driving control transistor M33, and the first driving output transistor M51 to remain conductive, and the signal of the second initial node N2 controls the second stage transmission output transistor M22 to turn off. As a result, the first stage transmission output transistor M21 outputs the first level signal Vgl as the stage transmission signal Vnext, and the first driving output transistor M51 outputs the first level signal Vgl as the gate driving signal Gout. The enable level of the driving control signal Vct is written to the gate of the second driving control transistor M32 via the first driving control transistor M31 to control the second driving control transistor M32 to turn on. The high-level signal of the second initial node N2 is transmitted to the first driving node N3, while the second level signal Vgh of the first electrode of the third driving control transistor M33 is also transmitted to the first driving node N3. As a result, the second driving output transistor M52 is turned off, and the active auxiliary transistor M41 is turned on and cannot transmit the second level signal Vgh to the driving output node N4. Moreover, the first level signal Vgl of the first electrode of the active auxiliary transistor M41 is transmitted to the driving output node N4 so that the gate driving signal Gout remains as the low-level first level signal Vgl.

In the t15 phase, since the input signal Vin remains at the low level of the t14 phase, the jump of the first clock signal CK1 does not affect the potentials of the first initial node N1, the second initial node N2, and the first driving node N3. Thus, the stage transmission signal Vnext and the gate driving signal Gout remain as the low-level first level signal Vgl.

In the t16 phase, the driving control signal Vct is at a high level, and the input signal Vin switches to a high level, while the first clock signal CK1 is at a high level, and the second clock signal CK2 is at a low level. In this case, the first clock signal CK1 controls the first input transistor M11 to turn off, the first initial node N1 remains at the low level of the previous phase, and the low level of the second clock signal CK2 is coupled to the first initial node N1 through the first bootstrap capacitor C0 so that the potential of the first initial node N1 is stabilized at a low level. As a result, the signal of the second initial node N2 is the same as that in the previous phase and remains at a high level, causing the stage transmission signal Vnext to remain at a low-level first level signal Vgl and the gate driving signal Gout to remain at a low-level first level signal Vgl. At the same time, the low level of the first initial node N1 controls the first driving control transistor M31, the third driving control transistor M33, and the first driving output transistor M51 to be turned on, and the first level signal Vgl is transmitted to the driving output node N4 through the first driving output transistor M51 so that the gate driving signal Gout remains at a low-level first level signal Vgl. In addition, the high level of the driving control signal Vct is transmitted to the gate of the second driving control transistor M32 through the first driving control transistor M31 so that the second driving control transistor M32 is turned off, and the third driving control transistor M33 is turned on under the control of the low level signal of the first initial node N1. In this manner, the second level signal Vgh is transmitted to the first driving node N3, the second driving output transistor M52 is turned off, and the active auxiliary transistor M41 is turned on. As a result, the second level signal Vgh of the first electrode of the second driving output transistor M52 cannot be transmitted to the driving output node N4, and the first level signal Vgl of the first electrode of the active auxiliary transistor M41 is transmitted to the driving output node N4 so that the gate driving signal Gout remains as the low-level first level signal Vgl.

In the t17 phase, the driving control signal Vct remains at a high level, and the input signal Vin remains at a high level, while the first clock signal CK1 is at a low level, and the second clock signal CK2 is at a high level. In this case, the first clock signal CK1 controls the first input transistor M11 to turn on, and the high-level input signal Vin is transmitted to the first initial node N1 through the first input transistor M11, causing the signal V_N1 of the first initial node N1 to be at a high level. The high-level signal can control the first stage transmission output transistor M21, the first driving control transistor M31, the third driving control transistor M33, and the first driving output transistor M51 to be turned off and the second initial control transistor M13 to be turned on. Then the first level signal Vgl is written to the second initial node through the second initial control transistor M13 so that the signal V_N2 of the second initial node N2 is at a low level. The low-level signal can simultaneously control the second stage transmission output transistor M22 to turn on, causing the high-level first level signal Vgh to be transmitted to the second electrode of the second stage transmission output transistor M22 and the initial output signal Vnext to be at a high level. At the same time, before the first driving control transistor M31 is disconnected, the high level of the driving control signal Vct is written to the gate of the second driving control transistor M32 so that the gate of the second driving control transistor M32 is disconnected. Thus, the low level signal of the second initial node N2 cannot be transmitted to the first driving node N3 through the second driving control transistor M32. The third driving control transistor M33 is turned on under the control of the low level signal of the first initial node N1 so that the second level signal Vgh of the first electrode of the third driving control transistor M33 is transmitted to the first driving node N3, and the second output transistor M52 is controlled to be disconnected. Thus, the second level signal Vgh of the first electrode of the second output transistor M52 cannot be transmitted to the driving output node N4. In addition, the high level signal of the first driving node N3 controls the active auxiliary transistor M41 to be turned on so that the first level signal Vgl of the first electrode of the active auxiliary transistor M41 is transmitted to the driving output node. In this manner, the gate driving signal Gout is at a low-level first level signal Vgl. That is, the stage transmission signal Vnext outputs a high level, and the gate driving signal Gout outputs a low level. In addition, the low level signal of the second initial node N2 controls the third auxiliary transistor M16 to turn on so that the second level signal Vgh is coupled to the first initial node N1 through the bootstrap capacitor C0, and the potential of the first initial node N1 is further raised. Thus, the first stage transmission output transistor M21, the first driving control transistor M31, the third driving control transistor M33, and the first driving output transistor M51 are completely disconnected.

In the t18 phase, the driving control signal Vct remains at a high level, the input signal Vin jumps to a low level, the first clock signal CK1 is at a high level, and the second clock signal CK2 is at a low level. In this case, the first clock signal CK1 controls the first input transistor M11 to be disconnected, and the signal of the first initial node N1 remains at the high level of the previous phase. Thus, the signal of the second initial node N2 is the same as that of the previous phase and remains at a low level, the stage transmission signal Vnext remains at a high-level second level signal Vgh, and the gate driving signal Gout remains at a low-level second level signal Vgh In the t19 phase, the input signal Vin remains at a low level, and the driving control signal Vct remains at a high level, while the first clock signal CK1 is at a low level, and the second clock signal CK2 is at a high level. Then the first input transistor M11 is turned on, and the low-level input signal Vin is transmitted to the first initial node N1. The signal V_N1 of the first initial node N1 controls the first initial control transistor M12 to turn on and writes the second level signal Vgh to the second initial node N2 so that the signal V_N2 of the second initial node N2 is at a high level. Thus, the signal V_N1 of the first initial node N1 controls the first stage transmission output transistor M21, the first driving control transistor M31, the third driving control transistor M33, and the first driving output transistor M51 to remain conductive, and the signal of the second initial node N2 controls the second stage transmission output transistor M22 to turn off. As a result, the first stage transmission output transistor M21 outputs the first level signal Vgl as the stage transmission signal Vnext, and the first driving output transistor M51 outputs the first level signal Vgl as the gate driving signal Gout. At the same time, the second level signal Vgh of the first electrode of the third driving control transistor M33 is transmitted to the first driving node N3, and then the second driving output transistor M52 is disconnected, and the active auxiliary transistor M41 is turned on. Thus, the second driving output transistor M52 cannot transmit the second level signal Vgh to the driving output node N4, and the active auxiliary transistor M41 transmits the first level signal Vgl of the first electrode to the driving output node N4, causing the gate driving signal Gout to remains as the first level signal Vgl of the low level.

After the phase t19, the input signal Vin remains at a low level, the driving control signal Vct remains at a high level, and the jump of the first clock signal CK1 does not affect the potentials of the first initial node N1, the second initial node N2, or the first driving node N3. In this manner, the stage transmission signal Vnext and the gate driving signal Gout remain at a low level.

In one or more embodiments, with continued reference to FIG. 24 and FIG. 26, during part of the time in the first mode Mode1, the driving control signal Vct received by the first shift register unit G01 is at an enable level; the transition moment between the enable level and the non-enable level of the driving control signal Vet is a first moment t1; during the phase when the input signal Vin received by the first shift register unit G01 is a valid pulse, the transition moment between the non-enable level and the enable level of the first clock signal CK1 is a second moment t2; the first moment t1 is before the second moment t2.

In one or more embodiments, the phase when the input signal Vin received by the first shift register unit G01 is a valid pulse is the phase t16 to t17. During the phase t16 to t17, the first clock signal CK1 changes from the non-enable level to the enable level at the second moment t2 so that the signal V_N1 of the first initial node N1 changes from the enable level to the non-enable level at the second moment t2, and the signal V_N2 of the second initial node N2 changes from the non-enable level to the enable level at the second moment t2. At the first moment t1 before the second moment t2, the driving control signal Vct changes from the enable level to the non-enable level so that the second driving control transistor M32 can be disconnected before the second moment t2. At the second moment t2, the signal V_N2 of the second initial node N2 changes from the non-enable level to the enable level, and the enable level is not written to the first driving node N3. In this manner, it is ensured that the gate driving signal Gout always outputs the first level signal Vgl, and the accuracy of the gate driving signal Gout can be guaranteed.

It can be understood that the gate driving signal Gout output by the driving output module 150 of each stage of shift register unit G may be provided to each row of pixel circuits 20, respectively. The pixel circuit 20 may include a preset module so that the gate driving signal Gout output by the shift register unit G can control the preset module in the pixel circuit 20 to turn on or off. That is, when the gate driving signal Gout output by the shift register unit G is at an enable level, the preset module of the pixel circuit 20 can be controlled to turn on, and when the gate driving signal Gout output by the shift register unit G is at a non-enable level, the preset module of the pixel circuit 20 can be controlled to turn off, so as to refresh the signal in the pixel circuit 20. The pixel circuit 20 may also include other modules, and the embodiment of the present invention does not specifically limit the specific structure of the pixel circuit 20.

In one or more embodiments, with reference to FIG. 3, the display panel 100 also includes multiple pixel circuits 20 arranged in an array and multiple scan signal lines SCAN; at least part of pixel circuits 20 in the same row are electrically connected to the same scan signal line SCAN; the driving output node N4 of the shift register unit G is electrically connected to at least one scan signal line SCAN.

In one or more embodiments, at least part of pixel circuits 20 in the same row are electrically connected to the same scan signal line SCAN so that the gate driving signal Gout transmitted by the scan signal line SCAN can refresh the pixel circuits 20 in a row, thereby achieving row-by-row scanning of the pixel circuits 20 in each row. The figure exemplarily shows the electrical connection between the driving output node N4 of the shift register unit G and a scan signal line SCAN. At this time, each shift register unit G only refreshes the signal of one row of pixel circuits 20. In another feasible embodiment, the shift register unit G may also be electrically connected to two or more scan signal lines SCAN so that the number of shift register units G can be reduced, thereby contributing to a narrower bezel of the display panel 100.

Figure 27:
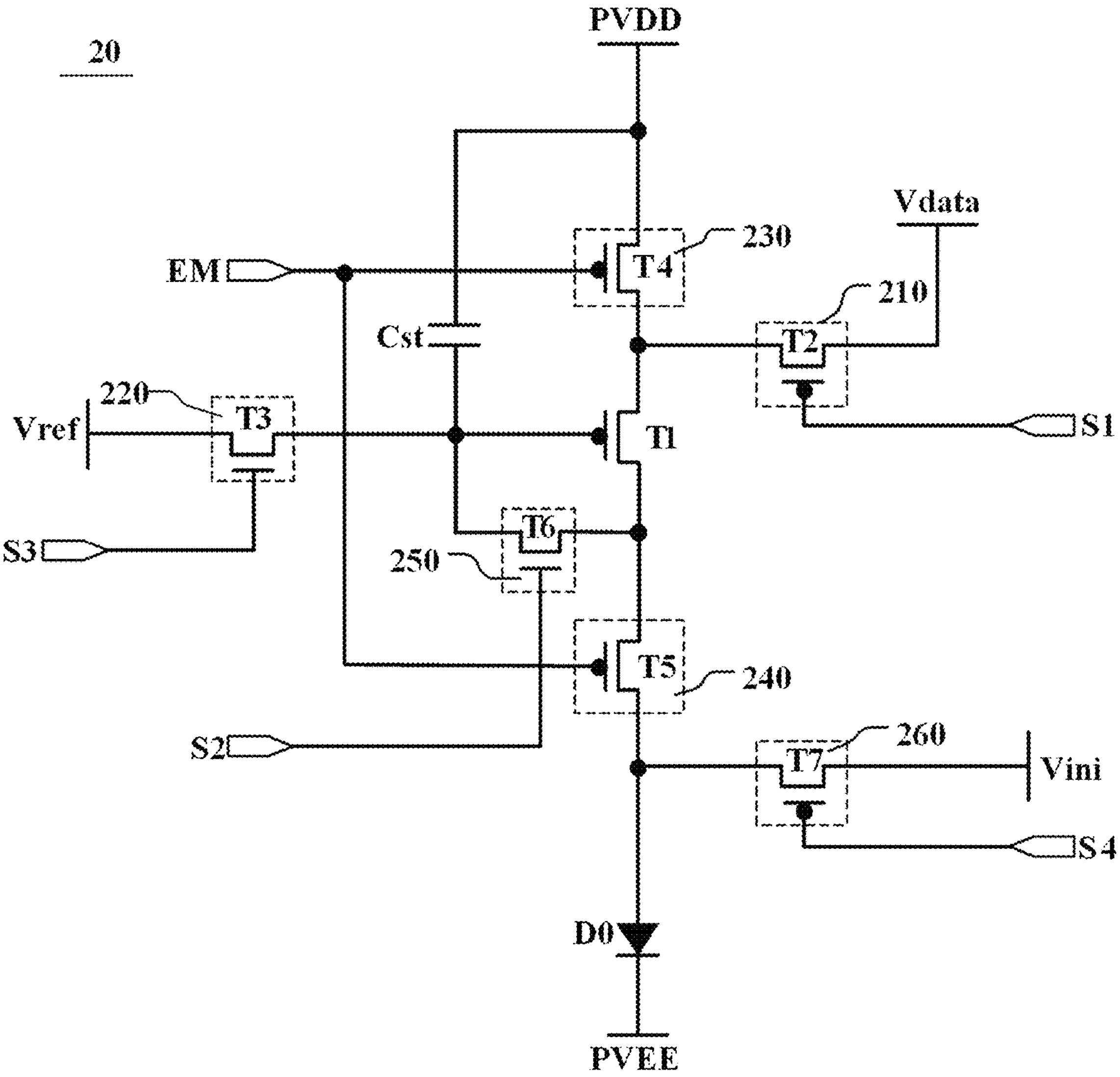
FIG. 27 is a diagram illustrating the structure of a pixel circuit according to an embodiment of the present invention.
Figure 28:
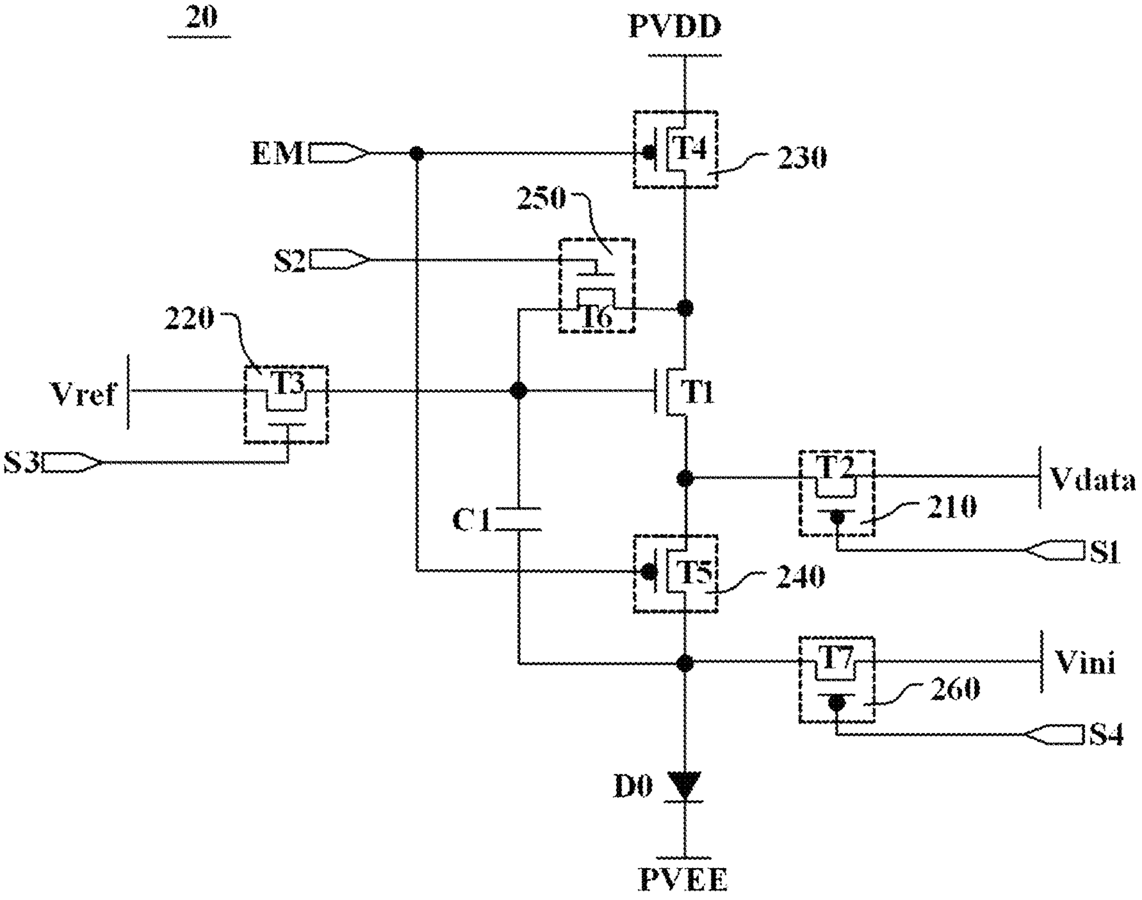
FIG. 28 is a diagram illustrating the structure of another pixel circuit according to an embodiment of the present invention.

In one or more embodiments, FIG. 27 is a diagram illustrating the structure of a pixel circuit according to an embodiment of the present invention, and FIG. 28 is a diagram illustrating the structure of another pixel circuit according to an embodiment of the present invention. As shown in FIG. 27 or 28, the pixel circuit 20 includes a drive transistor T1, a data write module 210, an initialization module 220, a first light emission control module 230, a second light emission control module 240, and a light-emitting element D0; the initialization module 220 and the data write module 210 are electrically connected to the drive transistor T1; the initialization module 220 is configured to at least receive the gate driving signal Gout to initialize a gate of the drive transistor T1; the data write module 210 is configured to write a data signal Vdata to the gate of the drive transistor T1; the first light emission control module 230 and the second light emission control module 240 are configured to control the drive transistor T1 to provide a drive current to the light-emitting element D0.

The drive transistor T1 may selectively provide a drive current to the light-emitting element D0 to drive the light-emitting element D0 to emit light. The data write module 210 is connected to a first terminal of the drive transistor T1 and is used to provide a data signal Vdata to the drive transistor T1 so that the drive transistor T1 can generate a drive current to drive the light-emitting element D0 to emit light based on the data signal Vdata. The initialization module 220 is connected to a control terminal of the drive transistor T1 and is used to provide a reset signal to the drive transistor T1 to reset the drive transistor T1. The first light emission control module 230 and the second light emission control module 240 may control the current path between the positive power signal PVDD and the negative power signal PVEE, thereby controlling the time when the drive transistor T1 provides the drive current to the light-emitting element D0. The first light emission control module 230 and the second light emission control module 240 may be turned on or off under the control of a light emission control signal EM. When the light emission control signal EM controls the first light emission control module 230 and the second light emission control module 240 to be turned on, the drive transistor T1 can generate a drive current and provide the drive current to the light-emitting element D0 to drive the light-emitting element D0 to emit light.

The light-emitting element D0 is usually a current-type drive element, and the data signal Vdata provided by the data write module 210 is usually a voltage signal. Therefore, a drive transistor T1 is set so that the data signal Vdata provided by the data write module 210 can be written to the gate of the drive transistor T1. Thus, the drive transistor T1 can generate a corresponding drive current based on the signal of the gate of T1 and provide the drive current to the light-emitting element D0, driving the light-emitting element D0 to emit light with a corresponding brightness. In this case, one of the source and the drain of the drive transistor T1 receives the positive power signal PVDD, and the other is coupled to the anode of the light-emitting element D0. The cathode of the light-emitting element D0 may receive the negative power signal PVEE so that a voltage difference is present between the positive power signal PVDD and the negative power signal PVEE, and a current path is formed. In this manner, the drive transistor T1 can generate a drive current and provide the drive current to the light-emitting element D0, driving the light-emitting element D0 to emit light.

It can be understood that as shown in FIG. 27, the active layer material of the drive transistor T1 may include a low-temperature polysilicon material so that the drive transistor T1 has a high carrier mobility, meeting the requirements such as high reaction speed and low power consumption. In this case, the drive transistor T1 may be a PMOS-type transistor. In other optional embodiments, as shown in FIG. 28, the active layer material of the drive transistor T1 may also include an oxide semiconductor material. In this case, the drive transistor T1 may be an NMOS-type transistor. The material and type of the drive transistor T1 are not specifically limited in this embodiment of the present invention on the premise that core invention points of embodiments of the present invention can be implemented.

The control terminal of the data write module 210 may receive a first scan signal S1, and the first scan signal S1 controls the data write module 210 to turn on and off. The control terminal of the initialization module 220 receives a third scan signal S3, and the third scan signal S3 controls the initialization module 220 to turn on and off. When the third scan signal S3 controls the initialization module 220 to turn on, the initialization signal Vref may be transmitted to the gate of the drive transistor T1 to initialize the gate of the drive transistor T1 to clear the data signal Vdata provided to the gate of the drive transistor T1 in the previous driving cycle and accurately write the subsequent data signal Vdata. When the first scan signal S1 controls the data write module 210 to turn on, the data signal Vdata may be written to the first electrode of the drive transistor T1 through the data write module 210 to refresh the signal of the first electrode of the drive transistor T1 if the drive transistor T1 is in the on state at this time.

In an example embodiment, the data write module 210 may include a data write transistor T2, a first electrode of the data write transistor T2 receives the data signal Vdata, a second electrode of the data write transistor T2 is electrically connected to the first electrode of the drive transistor T1, and a gate of the data write transistor T2 receives the first scan signal S1. In this manner, the first scan signal S1 controls the data write transistor T2 to turn on and off. The initialization module 220 includes an initialization transistor T3, a first electrode of the initialization transistor T3 receives the initialization signal Vref, a second electrode of the initialization transistor T3 is electrically connected to the gate of the drive transistor T1, and a gate of the initialization transistor T3 receives the third scan signal S3. In this manner, the third scan signal S3 controls the initialization transistor T3 to turn on and off. The first light emission control module 230 may include a first light emission control transistor T4. The second light emission control module 240 may include a second light emission control transistor T5. A first electrode of the first light emission control transistor T4 receives a positive power signal PVDD, a second electrode of the first light emission control transistor T4 is electrically connected to the first electrode of the drive transistor T1, a first electrode of the second light emission control transistor T5 is electrically connected to the second electrode of the drive transistor T1, and a second electrode of the second light emission control transistor T5 is electrically connected to the anode of the light-emitting element D0. The gate of the first light emission control transistor T4 and the gate of the second light emission control transistor T5 both receive the light-emitting control signal EM so that the light emission control signal EM can control the first light emission control transistor T4 and the second light emission control transistor T5 to turn on or off at the same time.

On the basis of the above embodiment, the pixel circuit 20 may also include a threshold compensation module 250 and a reset module 260. The threshold compensation module 250 is configured to receive the gate driving signal Gout and compensate the threshold compensation voltage to the gate of the drive transistor T1. The reset module 260 provides a reset signal for the light-emitting element.

The threshold compensation module 250 is connected between the control terminal of the drive transistor T1 and the second terminal. In this manner, when the data write module 210 provides the data signal Vdata to the drive transistor T1, the data signal Vdata can be compensated to ensure that the drive transistor T1 can provide an accurate drive current to the light-emitting element D0 and control the light-emitting accuracy of the light-emitting element D0. The reset module 260 is connected to the anode of the light-emitting element D0 and is used to provide an initialization signal Vini to the light-emitting element D0 to initialize the anode of the light-emitting element D0. The reset module 260 may be turned on or off under the control of a fourth scan signal S4, and when the fourth scan signal S4 controls the reset module 260 to turn on, the initialization signal Vini may be provided to the anode of the light-emitting element D0.

In an example embodiment, the threshold compensation module 250 includes a compensation transistor T6, a first electrode of the compensation transistor T6 is electrically connected to the second electrode of the drive transistor T1, a second electrode of the compensation transistor T6 is electrically connected to the gate of the drive transistor T1, and the compensation transistor T6 receives a second scan signal S2. Thus, the second scan signal S2 controls the compensation transistor T6 to turn on and off. The reset module 260 may include a reset transistor T7, a first electrode of the reset transistor T7 receives the reset signal Vini, a second electrode of the reset transistor T7 is electrically connected to the anode of the light-emitting element D0, and a gate of the reset transistor T7 receives the fourth scan signal S4. Thus, the fourth scan signal S4 can control the reset transistor T7 to turn on and off.

Based on the above embodiments, the pixel circuit 20 may also include a storage capacitor Cst, a first plate of the storage capacitor Cst receives a fixed signal (such as a positive power signal PVDD), and a second plate is electrically connected to the gate of the drive transistor T1 to store the signal at the gate of the drive transistor T1.

Figure 29:
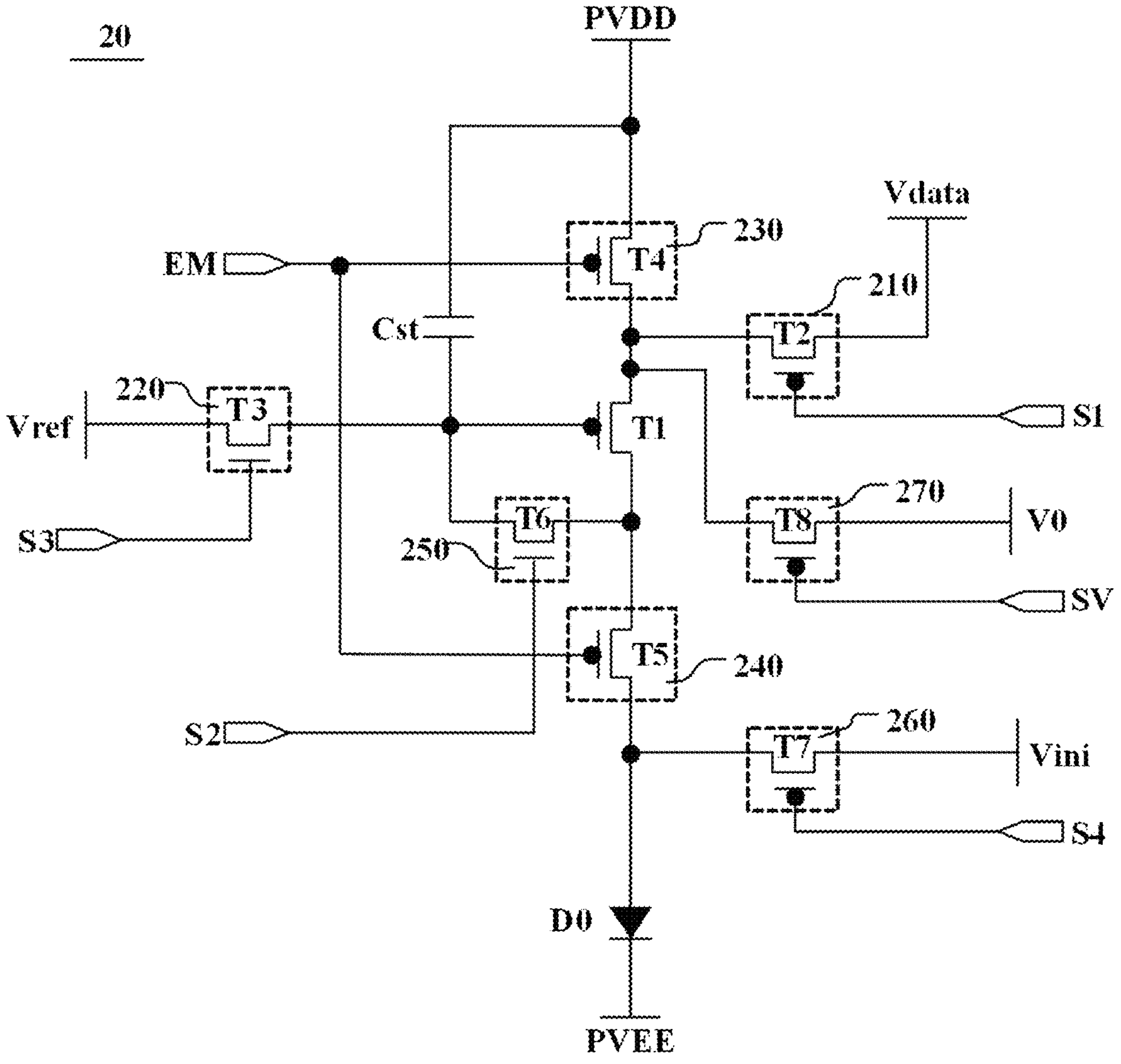
FIG. 29 is a diagram illustrating the structure of still another pixel circuit according to an embodiment of the present invention.
Figure 30:
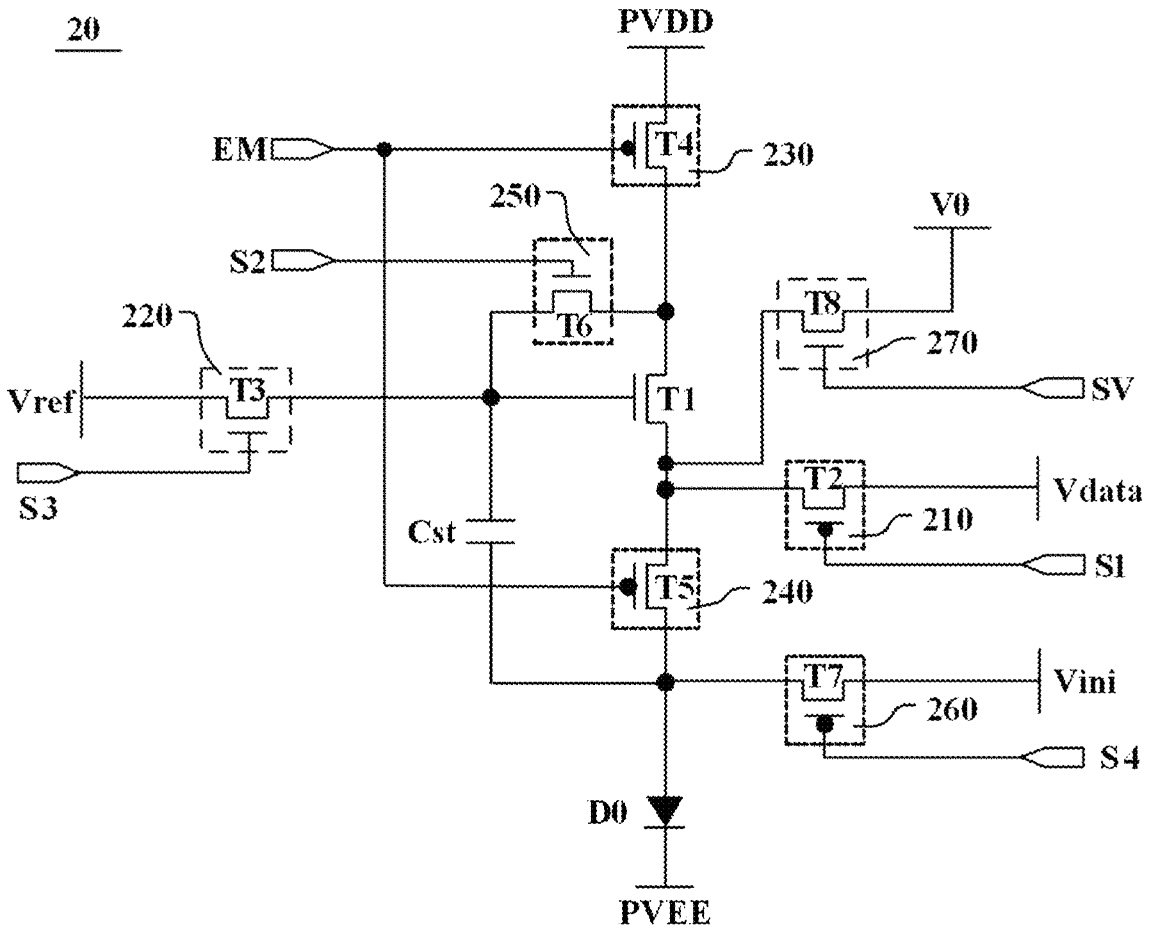
FIG. 30 is a diagram illustrating the structure of still another pixel circuit according to an embodiment of the present invention.

In another embodiment of the present invention, FIG. 29 and FIG. 30 are diagrams illustrating the structure of still another pixel circuit according to an embodiment of the present invention. With reference to any of the drawings of FIG. 29 and FIG. 30, on the basis of the above embodiments, the pixel circuit 20 may also include a bias adjustment module 270. The bias adjustment module 270 is connected to the first terminal or the second terminal of the drive transistor T1 and is used to provide a bias adjustment signal V0 for the drive transistor T1, so as to perform bias adjustment on the drive transistor T1.

The first electrode of the drive transistor T1 may be the first terminal of the drive transistor T1, and the second electrode of the drive transistor T1 may be the second terminal of the drive transistor T1. In this case, the bias adjustment module 270 may be electrically connected to the first electrode or the second electrode of the drive transistor T1. Special limitation is not made in this embodiment of the present invention on the premise that the bias adjustment on the drive transistor T1 can be performed.

In an optional embodiment, the bias adjustment module 270 may be turned on or off under the control of a bias adjustment control signal SV, and when the bias adjustment control signal SV controls the bias adjustment module 270 to be turned on, the bias adjustment signal V0 may be provided to the first electrode and/or the second electrode of the drive transistor T1 to perform bias adjustment on the drive transistor T1.

In an example embodiment, the bias adjustment module 270 may include a bias adjustment transistor T8. A first electrode of the bias adjustment transistor T8 receives the bias adjustment signal V0, a second electrode of the bias adjustment transistor T8 is electrically connected to the first electrode or second electrode of the drive transistor T1, and a gate of the bias adjustment transistor T8 receives a bias adjustment control signal SV so that the bias adjustment control signal SV can control the bias adjustment transistor T8 to turn on or off.

It should be noted that FIGS. 27 to 30 only provide several exemplary pixel circuit structures and are not exhaustive. On the premise that the core invention points of the embodiments of the present invention can be implemented, the embodiment of the present invention does not limit the specific structure of the pixel circuit.

Based on the above pixel circuits, the preset module of the pixel circuit 20 in the embodiment of the present invention may include any of the following modules: data write module 210, threshold compensation module 230, initialization module 220, reset module 260, first light emission control module 230, second light emission control module 240, and bias adjustment module 270. This configuration allows the gate driving signal output by the shift register unit to control the on or off state of any of the data write module 210, threshold compensation module 230, initialization module 220, reset module 260, first light emission control module 230, second light emission control module 240, and bias adjustment module 270. That is, the gate driving signal output by the shift register unit may include any one of the first scan signal S1, the second scan signal S2, the third scan signal S3, the fourth scan signal S4, the light-emitting control signal EM, and the bias adjustment control signal SV. For convenience of description, this embodiment uses an example where the gate driving signal output by the shift register unit is the third scan signal S3 for controlling the initialization module 220 to turn on or off. The driving principle of the pixel circuit 20 is described below.

With reference to FIG. 3 and any of the accompanying drawings of FIG. 27 to FIG. 30, the shift register units G of different stages provide gate driving signals Gout to the pixel circuits 20 of different rows to control the initialization modules 220 in the pixel circuits 20 of each row to turn on or off. The x-th stage shift register unit Gx and the y-th stage shift register unit Gy are used as an example. When the initialization module 220 in the x-th row pixel circuit 20 provides an initialization signal Vref to the gate of the drive transistor T1, the driving output module of the x-th stage shift register unit Gx can output the enable level of the gate driving signal Goutx to the x-th row pixel circuit 20 electrically connected to the shift register unit Gx under the control of the signal of the first driving node of the x-th stage shift register unit Gx. In this manner, the initialization module 220 of the x-th row pixel circuit 20 is turned on, and the initialization signal Vref is written to the drive transistor T1 of the pixel circuit 20 of the x-th row. At the same time, the initial output module of the x-th stage shift register unit Gx may also output the enable level of the initial output signal Vnextx to the y-th stage shift register unit Gy under the control of the signal of the first initial node N1 of the x-th stage shift register unit Gx as the input signal of the y-th stage shift register unit Gy. In this manner, the initial control module of the y-th stage shift register unit Gy controls the signal of the first initial node based on the input signal, and after the x-th stage shift register unit Gx outputs the initial output signal Vnextx that changes to the non-enable level, the initial output module of the y-th stage shift register unit Gy can output the enable level of the initial output signal Vnexty to the next-stage shift register unit of the y-th stage shift register unit Gy based on the signal of the first initial node to serve as the input signal of the next-stage shift register unit, thereby ensuring that the next-stage shift register unit can work normally. At the same time, the driving control module of the y-th stage shift register unit Gy controls the signal of the first driving node of the y-th stage shift register unit Gy based on the signal of the first initial node N1 of the y-th stage shift register unit Gy and the driving control signal Vct so that the driving output module of the y-th stage shift register unit Gy can output a corresponding gate driving signal Gouty based on the signal of the first driving node, and the gate driving signal Gouty may be the same as or different from the initial output signal Vnexty. Moreover, the gate driving signal Gout output by the driving output module of the y-th stage shift register unit Gy can be provided to the y-th row pixel circuit 20 electrically connected to the y-th shift register unit Gy so that the data write module 210 of the y-th row pixel circuit 20 is turned on or remains off to refresh the data signal Vdata in the y-th row pixel circuit 20 or keep the data signal unchanged. In this manner, each stage of shift register unit G provides the enable level of the initial output signal Vnext to the next stage of shift register unit and can also provide the enable level of the gate driving signal Gout to the initialization module 220 of the pixel circuit 20. Thus, the gate driving signal Gout of the initialization module 220 in the pixel circuit 20 is different from the initial output signal Vnext provided to the next stage of shift register unit. This configuration ensures the normal operation of the next-stage shift register unit and allows for the control of the gate potential of the drive transistor T1 in the pixel circuit 20, either refreshing or holding the signal as required. Moreover, the normal display and light emission of the display panel 100 are not affected by the mismatch between the input signal Vin required by the next-stage shift register unit and the gate driving signal required by the pixel circuit 20 electrically connected to the current-stage shift register unit, and thus the display panel 100 is designed with a diversified structure to meet various functional requirements.

It should be understood that for the case where the gate driving signal Gout output by the driver circuit 10 is the control signal for other modules in the pixel circuit 20, the case is similar to the one described above and will not be repeated here.

Based on the same inventive concept, the embodiment of the present invention also provides a display device. The display device includes the display panel provided by embodiments of the present invention. Therefore, the display device has the technical features of the display panel the driving method thereof provided in the embodiments of the present invention and can achieve the beneficial effects of the display panel provided in the embodiments of the present invention. Similarities may be referred to the preceding description of the display panel provided in the embodiments of the present invention and are not repeated herein.

Figure 31:
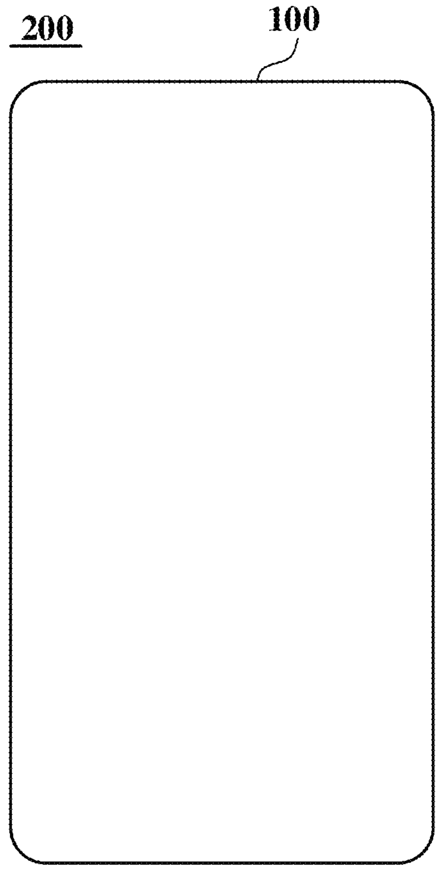
FIG. 31 is a diagram illustrating the structure of a display device according to an embodiment of the present invention.

In one or more embodiments, FIG. 31 is a diagram illustrating the structure of a display device according to an embodiment of the present invention. As shown in FIG. 31, the display device 200 includes the display panel 100 provided in embodiments of the present invention. The display device 200 provided by the embodiments of the present invention may be any electronic product with display function, including but not limited to the following categories: phones, televisions, laptops, desktop displays, tablet computers, digital cameras, smart bracelets, smart glasses, in-vehicle displays, industry-controlling equipment, medical displays, and touch interactive terminals. No special limitations are made thereto in the embodiments of the present invention.

The preceding embodiments do not limit the scope of the present invention. It is to be understood by those skilled in the art that various modifications, combinations, sub-combinations, and substitutions may be performed according to design requirements and other factors. Any modifications, equivalent substitutions, improvements, and the like made within the spirit and principle of the present invention are within the scope of the present invention.

What is claimed is:

1. A display panel, comprising a driver circuit; wherein the driver circuit comprises N-stage cascaded shift register units; a shift register unit of the N-stage cascaded shift register units comprises an initial control module, a stage transmission output module, a driving control module, an active auxiliary module, and a driving output module; and in a same shift register unit, the initial control module is configured to at least receive an input signal and a first clock signal and control a signal of a first initial node and a signal of a second initial node;

the stage transmission output module is configured to at least receive the signal of the first initial node, the signal of the second initial node, a first level signal, and a second level signal and control a stage transmission signal;

the driving control module is configured to at least receive the signal of the first initial node, the signal of the second initial node, and a driving control signal and control a signal of a first driving node;

the driving output module is configured to at least receive the signal of the first driving node, the signal of the first initial node, the first level signal, and the second level signal and control a signal of a driving output node; wherein the driving output node is configured to output a gate driving signal; and the active auxiliary module is configured to receive the signal of the first driving node and the first level signal and control a signal transmission path of the first level signal to the driving output node;

wherein a stage transmission signal of an i-th stage shift register unit of the N-stage cascaded shift register units is an input signal of a j-th stage shift register unit of the N-stage cascaded shift register units; wherein i, j, and N are each a positive integer, i≠j, i≤N, and j≤N.

2. The display panel of claim 1, wherein an operating mode of the display panel comprises a first mode, and at least part of display frames in the first mode is a first display frame;

the first display frame comprises a refresh phase and a hold phase;

the driver circuit comprises at least one first shift register unit; and in the refresh phase, the driving control signal comprises a non-enable level so that a stage transmission signal output by a first shift register unit of the at least one first shift register unit comprises a second level, and a gate driving signal is at a first level.

3. The display panel of claim 2, wherein in the refresh phase, in a case where the driving control signal is at a non-enable level, the stage transmission signal output by a same first shift register unit is at the second level, and in a case where the gate driving signal is at the first level, the signal of the first initial node is at a non-enable level, the signal of the second initial node is at an enable level, and the signal of the first driving node is at a non-enable level.

4. The display panel of claim 1, wherein in a case where the signal of the first driving node is at a non-enable level, the active auxiliary module controls the signal transmission path of the first level signal to the driving output node to be in an on state; and in a case where the signal of the first driving node is at an enable level, the active auxiliary module controls the signal transmission path of the first level signal to the driving output node to be in an off state.

5. The display panel of claim 2, wherein in the hold phase, the driving control signal is at a non-enable level, and the stage transmission signal and the gate driving signal output by each stage of shift register unit of the N-stage cascaded shift register units are both at the first level.

6. The display panel of claim 2, wherein the driver circuit further comprises a second shift register unit; and in the refresh phase of the first display frame, the driving control signal comprises an enable level so that the stage transmission signal and the gate driving signal output by the second shift register unit both comprise the second level.

7. The display panel of claim 6, wherein in the refresh phase, in a case where the driving control signal is at an enable level, and the stage transmission signal and the gate driving signal output by a same second shift register unit are both at the second level, the signal of the first initial node is at a non-enable level, the signal of the second initial node is at an enable level, and the signal of the first driving node is at an enable level.

8. The display panel of claim 6, wherein part of the display frames in the first mode is a second display frame;

in the second display frame, the stage transmission signal and the gate driving signal output by the first shift register unit both comprise the second level, and both the stage transmission signal and the gate driving signal output by the second shift register unit both comprise the second level; and the first mode comprises a plurality of display cycles, and a display cycle of the plurality of display cycles comprises at least one first display frame and at least one second display frame;

wherein the second display frame is before the first display frame.

9. The display panel of claim 2, wherein during part of time in the first mode, the driving control signal received by the first shift register unit is at an enable level, and a transition moment between the enable level and the non-enable level of the driving control signal is a first moment;

during a phase when an input signal received by the first shift register unit is a valid pulse, a transition moment between an enable level and a non-enable level of the first clock signal is a second moment; and before an output of the valid pulse of the input signal, the first moment is before the second moment.

10. The display panel of claim 6, wherein the operating mode of the display panel comprises a second mode, and in the second mode, frequency of the stage transmission signal output by the first shift register unit is equal to frequency of the gate driving signal output by the first shift register unit;

frequency of the stage transmission signal output by the second shift register unit is equal to frequency of the gate driving signal output by the second shift register unit; and the frequency of the gate driving signal output by the first shift register unit is equal to the frequency of the gate driving signal output by the second shift register unit.

11. The display panel of claim 10, wherein in the second mode, the driving control signal is maintained at an enable level.

12. The display panel of claim 1, wherein the active auxiliary module comprises an active auxiliary transistor; and a gate of the active auxiliary transistor is electrically connected to the first driving node, a first electrode of the active auxiliary transistor receives the first level signal, and a second electrode of the active auxiliary transistor is electrically connected to the driving output node.

13. The display panel of claim 1, wherein the driving control module comprises a first driving control unit and a second driving control unit;

the first driving control unit is configured to receive the driving control signal, the signal of the first initial node, and the signal of the second initial node and control the signal of the first driving node; and the second driving control unit is configured to receive the signal of the first initial node and the second level signal and control the signal of the first driving node.

14. The display panel of claim 13, wherein the first driving control unit comprises a first driving control transistor, a second driving control transistor, and a first storage capacitor;

a gate of the first driving control transistor is electrically connected to the first initial node, and a first electrode of the first driving control transistor receives the driving control signal;

a gate of the second driving control transistor is electrically connected to a second electrode of the first driving control transistor and a first plate of the first storage capacitor, a first electrode of the second driving control transistor is electrically connected to the second initial node, and a second electrode of the second driving control transistor is electrically connected to the first driving node; and a second plate of the first storage capacitor receives a fixed signal.

15. The display panel of claim 13, wherein the second driving control unit comprises a third driving control transistor and a second storage capacitor;

a gate of the third driving control transistor is electrically connected to the first initial node, a first electrode of the third driving control transistor receives the second level signal, and a second electrode of the third driving control transistor is electrically connected to the first driving node; and a first plate of the second storage capacitor receives a fixed signal, and a second plate of the second storage capacitor is electrically connected to the first driving node.

16. The display panel of claim 1, wherein the driving output module comprises a first driving output unit and a second driving output unit;

the first driving output unit is configured to receive the signal of the first initial node and the first level signal and control the gate driving signal; and the second driving output unit is configured to receive the signal of the first driving node and the second level signal and control the gate driving signal.

17. The display panel of claim 16, wherein the first driving output unit comprises a first driving output transistor; and a gate of the first driving output transistor is electrically connected to the first initial node, a first electrode of the first driving output transistor receives the first level signal, and a second electrode of the first driving output transistor is electrically connected to the driving output node.

18. The display panel of claim 16, wherein the second driving output unit comprises a second driving output transistor; and a gate of the second driving output transistor is electrically connected to the first driving node, a first electrode of the second driving output transistor receives the second level signal, and a second electrode of the second driving output transistor is electrically connected to the driving output node.

19. The display panel of claim 1, wherein the stage transmission output module comprises a first stage transmission output unit and a second stage transmission output unit;

the first stage transmission output unit is configured to receive the signal of the first initial node and the first level signal and control the stage transmission signal; and the second stage transmission output unit is configured to receive the signal of the second initial node and the second level signal and control the stage transmission signal.

20. The display panel of claim 19, wherein the first stage transmission output unit comprises a first stage transmission output transistor; and a gate of the first stage transmission output transistor is electrically connected to the first initial node, a first electrode of the first stage transmission output transistor receives the first level signal, and a second electrode of the first stage transmission output transistor outputs the stage transmission signal.

21. The display panel of claim 19, wherein the second stage transmission output unit comprises a second stage transmission output transistor; and a gate of the second stage transmission output transistor is electrically connected to the second initial node, a first electrode of the second stage transmission output transistor receives the second level signal, and a second electrode of the second stage transmission output transistor outputs the stage transmission signal.

22. The display panel of claim 1, wherein the initial control module comprises a first initial control unit and a second initial control unit;

the first initial control unit is configured to receive the input signal and the first clock signal and control the signal of the first initial node; and the second initial control unit is configured to receive the signal of the first initial node, the first level signal, and the second level signal and control the signal of the second initial node.

23. The display panel of claim 22, wherein the first initial control unit comprises an input subunit; and the input subunit is configured to receive the input signal and the first clock signal and control the signal of the first initial node.

24. The display panel of claim 23, wherein the input subunit comprises a first input transistor; and a gate of the first input transistor receives the first clock signal, a first electrode of the first input transistor receives the input signal, and a second electrode of the first input transistor is electrically connected to the first initial node.

25. The display panel of claim 23, wherein the first initial control unit further comprises a charge pump subunit, and the first initial node comprises a first initial subnode and a second initial subnode;

the input subunit is further configured to receive the input signal and the first clock signal and control a signal of the first initial subnode;

the charge pump subunit is configured to receive the signal of the first initial subnode and a second clock signal and control a signal of the second initial subnode; and the stage transmission output module is further configured to control the stage transmission signal based on the signal of the second initial node and the signal of the second initial subnode.

26. The display panel of claim 25, wherein the charge pump subunit comprises a first auxiliary transistor, a second auxiliary transistor, and a first bootstrap capacitor;

a gate of the first auxiliary transistor and a first electrode of the first auxiliary transistor are both electrically connected to the first initial subnode, and a second electrode of the first auxiliary transistor is electrically connected to the second initial subnode; and a gate of the second auxiliary transistor is electrically connected to the first initial subnode, a first electrode of the second auxiliary transistor receives the second clock signal, a second electrode of the second auxiliary transistor is electrically connected to a first plate of the first bootstrap capacitor, and a second plate of the first bootstrap capacitor is electrically connected to the first initial subnode.

27. The display panel of claim 26, wherein the charge pump subunit further comprises a third auxiliary transistor; and a gate of the third auxiliary transistor is electrically connected to the second initial node, a first electrode of the third auxiliary transistor receives the second level signal, and a second electrode of the third auxiliary transistor is electrically connected to the first plate of the first bootstrap capacitor.

28. The display panel of claim 22, wherein the first initial control unit further comprises a voltage regulator subunit; and an input subunit is electrically connected to the first initial node through the voltage regulator subunit.

29. The display panel of claim 22, wherein the second initial control unit comprises a first initial control subunit and a second initial control subunit;

the first initial control subunit is configured to receive the second level signal and the signal of the first initial node and control the signal of the second initial node; and the second initial control subunit is configured to receive the first level signal and the signal of the first initial node and control the signal of the second initial node.

30. The display panel of claim 29, wherein the first initial control subunit comprises a first initial control transistor; and a gate of the first initial control transistor is electrically connected to the first initial node, a first electrode of the first initial control transistor receives the second level signal, and a second electrode of the first initial control transistor is electrically connected to the second initial node.

31. The display panel of claim 29, wherein the second initial control subunit comprises a second initial control transistor; and a gate of the second initial control transistor is electrically connected to the first initial node, a first electrode of the second initial control transistor receives the first level signal, and a second electrode of the first initial control transistor is electrically connected to the second initial node.

32. The display panel of claim 22, wherein the initial control module further comprises a storage unit; and a first terminal of the storage unit receives a fixed signal, and a second terminal of the storage unit is electrically connected to the second initial node.

33. The display panel of claim 32, wherein the storage unit comprises a third storage capacitor; and a first plate of the third storage capacitor receives the fixed signal, and a second plate of the third storage capacitor is electrically connected to the second initial node.

34. The display panel of claim 1, further comprising a plurality of pixel circuits arranged in an array and a plurality of scan signal lines;

at least part of pixel circuits in a same row are electrically connected to a same scan signal line; and the driving output node of the shift register unit is electrically connected to at least one scan signal line of the plurality of scan signal lines.

35. The display panel of claim 1, further comprising a plurality of pixel circuits arranged in an array; wherein a pixel circuit of the plurality of pixel circuits comprises a drive transistor, a data write module, an initialization module, a first light emission control module, a second light emission control module, and a light-emitting element;

the initialization module and the data write module are electrically connected to the drive transistor;

the initialization module is configured to at least receive the gate driving signal and initialize a gate of the drive transistor;

the data write module is configured to write a data signal to the gate of the drive transistor; and the first light emission control module and the second light emission control module are configured to control the drive transistor to provide a drive current to the light-emitting element.

36. The display panel of claim 35, wherein the pixel circuit further comprises a threshold compensation module and a reset module;

the threshold compensation module is configured to receive the gate driving signal and compensate a threshold compensation voltage to the gate of the drive transistor; and the reset module provides a reset signal to the light-emitting element.

37. A display device, comprising a display panel, wherein the display panel comprises a driver circuit; wherein the driver circuit comprises N-stage cascaded shift register units; a shift register unit of the N-stage cascaded shift register units comprises an initial control module, a stage transmission output module, a driving control module, an active auxiliary module, and a driving output module; and in a same shift register unit, the initial control module is configured to at least receive an input signal and a first clock signal and control a signal of a first initial node and a signal of a second initial node;

the stage transmission output module is configured to at least receive the signal of the first initial node, the signal of the second initial node, a first level signal, and a second level signal and control a stage transmission signal;

the driving control module is configured to at least receive the signal of the first initial node, the signal of the second initial node, and a driving control signal and control a signal of a first driving node;

the driving output module is configured to at least receive the signal of the first driving node, the signal of the first initial node, the first level signal, and the second level signal and control a signal of a driving output node; wherein the driving output node is configured to output a gate driving signal; and the active auxiliary module is configured to receive the signal of the first driving node and the first level signal and control a signal transmission path of the first level signal to the driving output node;

wherein a stage transmission signal of an i-th stage shift register unit of the N-stage cascaded shift register units is an input signal of a j-th stage shift register unit of the N-stage cascaded shift register units; wherein i, j, and N are each a positive integer, $i \neq j$, $i \leq N$, and $j \leq N$.

* * * * *